(12) United States Patent
Jain

(10) Patent No.: US 10,284,656 B2
(45) Date of Patent: *May 7, 2019

(54) TECHNIQUES FOR COMMUNICATION BETWEEN SERVICE CAPABILITY SERVER AND INTERWORKING FUNCTION FOR DEVICE TRIGGER RECALL/REPLACE

(71) Applicant: Intel IP Corporation, Santa Clara, CA (US)

(72) Inventor: Puneet K. Jain, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/872,863

(22) Filed: Jan. 16, 2018

(65) Prior Publication Data

US 2018/0205796 A1 Jul. 19, 2018

Related U.S. Application Data

(63) Continuation of application No. 15/060,120, filed on Mar. 3, 2016, now Pat. No. 9,936,026, which is a
(Continued)

(51) Int. Cl.
*H04L 29/08* (2006.01)
*H04W 4/70* (2018.01)
(Continued)

(52) U.S. Cl.
CPC .......... *H04L 67/125* (2013.01); *H04L 67/28* (2013.01); *H04W 4/12* (2013.01); *H04W 4/70* (2018.02); *H04W 8/22* (2013.01); *H04W 84/042* (2013.01)

(58) Field of Classification Search
CPC ......... H04W 4/005; H04W 8/22; H04W 4/12; H04W 4/70; H04L 67/125; H04L 67/28
See application file for complete search history.

(56) References Cited

U.S. PATENT DOCUMENTS 8,837,422 B2 * 9/2014 Chen .................... H04L 5/0023
370/330
8,885,560 B2 * 11/2014 Wallen .................. H04W 48/12
370/328
(Continued)

FOREIGN PATENT DOCUMENTS

WO 2013141599 A1 9/2013
WO 2013189222 A1 12/2013

OTHER PUBLICATIONS

3GPP TR 23.887 V12.0.0 (Dec. 2013) 3rd Generation Partnership Project; Technical Specification Group Services and System Aspects; Study on Machine-Type Communications (MTC) and other mobile data applications communications enhancements (Release 12) 151 pages.
(Continued)

*Primary Examiner* — Leon Flores
(74) *Attorney, Agent, or Firm* — Compass IP Law PC

(57) ABSTRACT

Examples may include techniques for a device trigger recall or a device trigger replace procedure as implemented at a machine type communication-interworking function (MTC-IWF) in response to a command received from a service capability server (SCS). Examples may also include the SCS generating a command for a device trigger recall or a device replace to cause the MTC-IWF to implement the device trigger recall or device trigger replace procedure to either recall or replace a trigger message destined for user equipment. Both the MTC-IWF and the SCS may operate in compliance with one or more $3^{rd}$ Generation Partnership Project (3GPP) Long Term Evolution (LTE) standards.

28 Claims, 22 Drawing Sheets

Related U.S. Application Data continuation of application No. 14/483,620, filed on Sep. 11, 2014, now Pat. No. 9,301,083.

(60) Provisional application No. 61/924,194, filed on Jan. 6, 2014.

(51) Int. Cl.
  *H04W 4/12* (2009.01)
  *H04W 8/22* (2009.01)
  *H04W 84/04* (2009.01)

(56) References Cited

U.S. PATENT DOCUMENTS

| | | | | |
|---|---|---|---|---|
| 9,232,520 B2* | 1/2016 | Lee | | H04L 5/0042 |
| 9,674,821 B2* | 6/2017 | Ohta | | H04W 52/0216 |
| 9,723,508 B2* | 8/2017 | Davydov | | H04W 72/12 |
| 2011/0269447 A1* | 11/2011 | Bienas | | H04W 8/22 |
| | | | | 455/422.1 |
| 2011/0312331 A1* | 12/2011 | Hakola | | H04W 72/085 |
| | | | | 455/452.2 |
| 2013/0058311 A1* | 3/2013 | Park | | H04W 36/0033 |
| | | | | 370/331 |
| 2013/0114393 A1* | 5/2013 | Lee | | H04L 5/0048 |
| | | | | 370/210 |
| 2013/0265953 A1 | 10/2013 | Salkintzis et al. | | |
| 2014/0003313 A1 | 1/2014 | Jain et al. | | |
| 2014/0098775 A1* | 4/2014 | Horiuchi | | H04W 72/0453 |
| | | | | 370/329 |
| 2014/0254509 A1* | 9/2014 | Chen | | H04L 5/0058 |
| | | | | 370/329 |
| 2014/0269779 A1 | 9/2014 | Shan et al. | | |
| 2014/0286277 A1* | 9/2014 | Jang | | H04L 5/0048 |
| | | | | 370/329 |
| 2014/0328230 A1* | 11/2014 | Park | | H04W 4/70 |
| | | | | 370/281 |
| 2015/0036651 A1* | 2/2015 | Takeda | | H04W 4/70 |
| | | | | 370/330 |
| 2015/0050955 A1 | 2/2015 | Kim et al. | | |
| 2015/0172890 A1 | 6/2015 | Xu | | |
| 2015/0181564 A1* | 6/2015 | Rao | | H04W 4/70 |
| | | | | 370/329 |
| 2015/0195718 A1* | 7/2015 | Jain | | H04W 4/70 |
| | | | | 370/328 |
| 2015/0264512 A1* | 9/2015 | Jain | | H04W 4/70 |
| | | | | 370/328 |
| 2015/0289280 A1* | 10/2015 | Davydov | | H04W 72/12 |
| | | | | 370/252 |
| 2015/0341889 A1* | 11/2015 | Starsinic | | H04W 60/06 |
| | | | | 370/329 |
| 2015/0359007 A1* | 12/2015 | Liu | | H04L 5/0005 |
| | | | | 370/329 |

OTHER PUBLICATIONS

3GPP TS 23.682 V115.0 (Sep. 2013) 3rd Generation Partnership Project; Technical Specification Group Services and System Aspects; Architecture enhancements to facilitate communications with packet data networks and applications, (Release 11) 29 pages.

3GPP TS 29.368 V11.4.0 (Sep. 2013) 3rd Generation Partnership Project; Technical Specification Group Core Network and Terminals; TSP interface protocol between the MTC Interworking Function (MTC-IWF) and Service Capability Server (SCS) (Release 11) 21 pages.

Ericsson et al., "Assignment of Allocated Diameter Code Values", C3-131990, 3GPP TSG-CT WG3 Meeting #71, Nov. 12-16, 2012, 12 pages.

Extended European Search Report for Patent Application No. 15733071.3, dated May 18, 2017, 10 pages.

International Preliminary Report on Patentability received for International Application No. PCT/US2015/010309, dated Jul. 21, 2016, 9 pages.

International Search Report and Written Opinion received for PCT Patent Application No. PCT/US2015/010309, dated Mar. 27, 2015, 16 pages.

Office Action for U.S. Appl. No. 14/483,620, dated Jul. 31, 2015, 6 pages.

Office Action for U.S. Appl. No. 15/060,120, dated Sep. 19, 2017, 11 pages.

Chinese First Office Action of P.R. China State Intellectual Property Office for Patent Application No. 201580002843.8, dated Aug. 28, 2018, 32 pages.

European First Office Action for Patent Application No. 15733071.3, dated May 24, 2018, 7 pages.

European Second Office Action for Patent Application No. 15733071.3, dated Oct. 19, 2018, 10 pages.

\* cited by examiner

Command 300

```
310 ─┐
<DA-Answer> ::= < Diameter Header: 8388639, PXY >
                < Session-Id >
                { Auth-Application-Id }
                { Auth-Session-State }
                { Origin-Host }
                { Origin-Realm }
                [ Result-Code ]
                [ Experimental-Result ]
                [ Error-Message ]
                [ Error-Reporting-Host ]
         330   *[ Failed-AVP ]
          ┌─   [ Origin-State-Id ]
          └─  { Device-Notification }
               *[ Redirect-Host ]
                [ Redirect-Host-Usage ]
                [ Redirect-Max-Cache-Time ]
               *[ Proxy-Info ]
               *[ Supported-Features ]
               *[ AVP ]
         332
```

Device-Notification AVP
< AVP Header: 3002 >
[ External-Id ]
[ MSISDN ]
[ SCS-Identifier ]
{ Reference-Number }
{ Action-Type }
{ Request-Status }
[Delivery-Outcome ]
*[ AVP ]

Reference-Number AVP
< AVP Header: 3007 >
[ Unique Reference-Number ]
*[ AVP ]

334
Action-Type AVP
< AVP Header: 3005 >
[ Device Trigger Recall (3) ]
*[ AVP ]

336
Request-Status AVP
< AVP Header: 3008 >
[ Success (0) or RecallFail (111) ]
*[ AVP ]

RECEIVE, AT AN MTC-IWF CAPABLE OF OPERATING IN COMPLIANCE WITH ONE OR MORE 3GPP LTE STANDARDS INCLUDING LTE-A, A DAR COMMAND FROM AN SCS THROUGH A Tsp INTERFACE, THE DAR COMMAND INCLUDING A DEVICE-ACTION AVP HAVING A UE IDENTIFIER TO INDICATE AN UE TO RECEIVE A TRIGGER MESSAGE INITIATED BY THE SCS, AN SCS-IDENTIFIER FOR THE SCS, A REFERENCE-NUMBER AVP SET TO IDENTIFY THE TRIGGER MESSAGE AND AN ACTION-TYPE AVP SET TO A VALUE TO INDICATE A DEVICE TRIGGER RECALL REQUEST TO RECALL THE TRIGGER MESSAGE
1602

DETERMINE A STATUS OF THE DEVICE TRIGGER RECALL REQUEST RESPONSIVE TO ONE OF AN INITIATION OF A RECALL PROCEDURE WITH AN SMS-SC OR A REJECTION OF THE INITIATION OF THE RECALL PROCEDURE BY THE MTC-IWF
1604

SEND A DAA COMMAND TO THE SCS THROUGH THE Tsp INTERFACE, THE DAA COMMAND INCLUDING A DEVICE-NOTIFICATION AVP HAVING THE UE IDENTIFIER, THE SCS-IDENTIFIER, THE REFERENCE-NUMBER AVP, THE ACTION-TYPE AVP AND A REQUEST-STATUS AVP SET TO A VALUE TO INDICATE SUCCESS OR FAILURE OF THE DEVICE TRIGGER RECALL REQUEST
1606

*FIG. 16*

Storage Medium 1700

Computer Executable
Instructions for 1600

SEND, FROM AN SCS CAPABLE OF OPERATING IN COMPLIANCE WITH ONE OR MORE 3GPP LTE STANDARDS INCLUDING LTE-A, A DAR COMMAND TO AN MTC-IWF THROUGH A Tsp INTERFACE, THE DAR COMMAND INCLUDING A DEVICE-ACTION AVP HAVING AN UE IDENTIFIER TO INDICATE AN UE TO RECEIVE A FIRST TRIGGER MESSAGE INITIATED BY THE SCS, AN SCS-IDENTIFIER FOR THE SCS, AN ACTION-TYPE AVP SET TO A VALUE TO INDICATE A DEVICE TRIGGER REPLACE REQUEST TO REPLACE THE FIRST TRIGGER MESSAGE WITH A SECOND TRIGGER MESSAGE, A REFERENCE-NUMBER AVP SET TO IDENTIFY THE SECOND TRIGGER MESSAGE AND AN OLD-REFERENCE-NUMBER AVP SET TO IDENTIFY THE FIRST TRIGGER MESSAGE
1902

RECEIVE A DAA COMMAND FROM THE MTC-IWF THROUGH THE Tsp INTERFACE, THE DAA COMMAND INCLUDING A DEVICE-NOTIFICATION AVP HAVING THE UE IDENTIFIER, THE SCS-IDENTIFIER, THE REFERENCE-NUMBER AVP, THE ACTION-TYPE AVP AND A REQUEST-STATUS AVP SET TO A VALUE TO INDICATE SUCCESS OR FAILURE OF THE DEVICE TRIGGER REPLACE REQUEST
1904

DETERMINE THE STATUS OF THE DEVICE TRIGGER REPLACE REQUEST BASED ON THE VALUE SET IN THE REQUEST-STATUS AVP
1906

*FIG. 19*

Storage Medium 2000

Computer Executable
Instructions for 1900

*FIG. 20*

TECHNIQUES FOR COMMUNICATION BETWEEN SERVICE CAPABILITY SERVER AND INTERWORKING FUNCTION FOR DEVICE TRIGGER RECALL/REPLACE

RELATED CASE

This application is a continuation of and claims the benefit of priority to previously filed U.S. patent application Ser. No. 15/060,120 filed Mar. 3, 2016, which in turn claims priority to U.S. patent application Ser. No. 14/483,620 filed Sep. 11, 2014, which claims priority to U.S. Provisional Patent Application No. 61/924,194 filed on Jan. 6, 2014; all of which are incorporated herein by reference in their entirety.

TECHNICAL FIELD

Examples described herein are generally related to wireless communication devices.

BACKGROUND

With a wide range of potential applications, machine type communication (MTC) or machine to machine (M2M) communication is gaining a tremendous interest among mobile network operators, equipment vendors, MTC specialist companies, and research bodies. The idea of M2M communications is to enable M2M components to be interconnected, networked, and controlled remotely with low-cost scalable and reliable technologies. M2M communication could be carried over mobile networks (e.g. GSM-GPRS, CDMA EVDO networks). In the M2M communication, the role of mobile network is largely confined to serve as a transport network.

M2M devices or user equipment (UEs) coupled to a mobile network may be capable of replying to request for data contained within these types of UEs responsive to trigger messages. These UEs may also be capable of transmitting data autonomously and parameters defining what or when data is transmitted may be adjusted or updated responsive to trigger messages.

BRIEF DESCRIPTION OF THE DRAWINGS

FIG. 3 illustrates an example second command.
FIG. 16 illustrates an example of a first logic flow.
FIG. 17 illustrates an example of a first storage medium.
FIG. 19 illustrates an example of a second logic flow.
FIG. 20 illustrates an example of a second storage medium.

DETAILED DESCRIPTION

Figure 1:
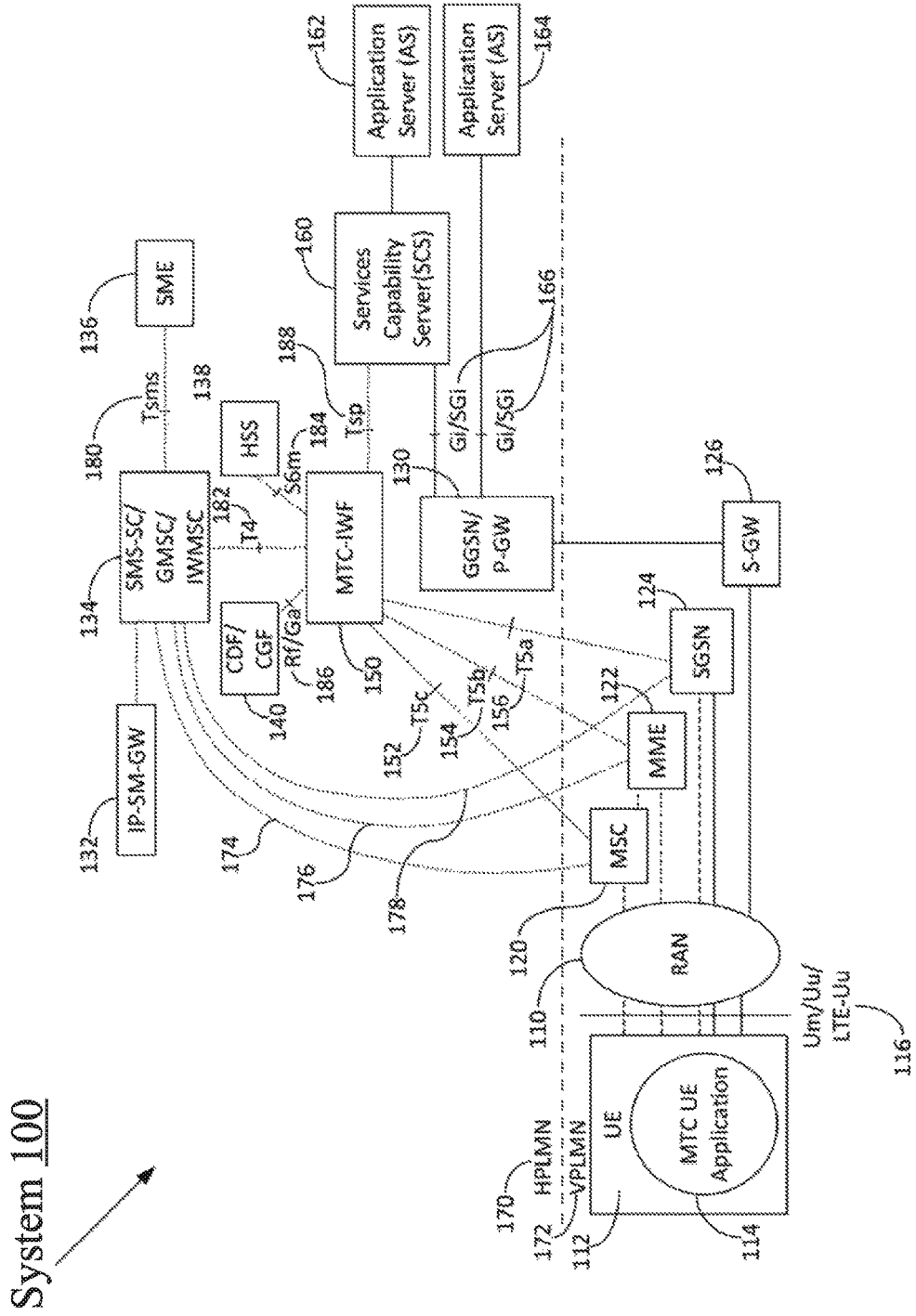
FIG. 1 illustrates an example of a system.

Examples are generally directed to improvements for Machine Type Communication (MTC) or Machine to Machine (M2M) communication that may involve use of wireless mobile telecommunication cellular or wireless mobile broadband technologies. Wireless mobile broadband technologies may include any wireless technologies suitable for use with wireless devices or user equipment (UE), such as one or more third generation (3G), fourth generation (4G) or emerging fifth generation (5G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context.

By way of example and not limitation, various examples may be described with specific reference to various 3GPP radio access network (RAN) standards, such as the 3GPP Universal Terrestrial Radio Access Network (UTRAN), the 3GPP Evolved Universal Terrestrial Radio Access Network (E-UTRAN) and 3GPP's suite of UMTS and LTE/LTE-Advanced Technical Specifications (in case of LTE/LTE-Advanced collectively "3GPP LTE Specifications" according to the 36 Series of Technical Specifications), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for Wireless-MAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

As contemplated in the present disclosure, M2M devices or UEs may be capable of replying to a request for data contained within these types of UEs responsive to trigger messages. Triggering of UEs via trigger messages may be based on the use of an identifier identifying the UE that needs to be triggered. For example, a trigger message may be used by the network to wake up a given UE, e.g., to initiate communications. In other examples, a services capability server (SCS) may use a trigger message to send information to another UE via a 3GPP network to trigger the other UE to perform application specific actions that include initiating communication with the SCS.

In some examples, however, an UE may become temporarily unavailable to receive trigger messages. For example, the UE may be out of coverage, resource constrained or runs out of storage space. In such cases, the 3GPP network may store or en-queue the undelivered trigger messages for the UE and may re-attempt delivery at a later stage if the trigger validity period has not expired. Nevertheless, when a trigger message is queued for delivery, the trigger message may no longer be necessary or the trigger message itself may become redundant or irrelevant. For example, a stored trigger message that requests the UE to send smart meter billing data for 10 minutes may later be ineffective because 20 minutes of smart meter billing data may now be requested. A stored trigger message that requests the UE to establish a user plane communication link may become obsolete if the trigger message is queued for too long. Also, the SCS may lose the context for the device message while the trigger message is queued. Further, if unnecessary trigger messages are delivered, then network resources are wasted and the network becomes inefficient. It is with respect to these and other challenges that the examples described herein are needed.

In some first examples, techniques are implemented for a device trigger recall procedure. The techniques may include receiving, at a machine type communication-interworking function (MTC-IWF) capable of operating in compliance with one or more 3GPP LTE standards including LTE-A, a Device-Action-Request (DAR) command from an SCS through a Tsp interface. The DAR command may include a Device-Action attribute value pair (AVP) having an UE identifier to indicate an UE (e.g., an M2M UE) to receive a trigger message initiated by the SCS, an SCS-Identifier for the SCS, a Reference-Number AVP set to identify the trigger message and an Action-Type AVP set to a value to indicate a device trigger recall request to recall the trigger message. The techniques may also include determining a status of the device trigger recall request responsive to one of an initiation of a recall procedure with a short message service-service center (SMS-SC) or a rejection of the initiation of the recall procedure by the MTC-IWF. The techniques may also include sending a Device-Action-Answer (DAA) command to the SCS through the Tsp interface. The DAA command may include a Device-Notification AVP having the UE identifier, the SCS-Identifier, the Reference-Number AVP, the Action-Type AVP and a Request-Status AVP set to a value to indicate success or failure of the device trigger recall request.

In some second examples, techniques are implemented for a device trigger replace procedure. The techniques may include receiving, at an MTC-IWF capable of operating in compliance with one or more 3GPP standards including LTE or LTE-A, a DAR command from an SCS through a Tsp interface. The DAR command may include a Device-Action AVP having an UE identifier to indicate an UE to receive a first trigger message initiated by the SCS, an SCS-Identifier for the SCS, an Action-Type AVP set to a value to indicate a device trigger replace request to replace the first trigger message with a second trigger message, a Reference-Number AVP set to identify the second trigger message and an Old-Reference-Number AVP set to identify the first trigger message (intended to be replaced). The techniques may also include forwarding the device trigger replace request to an SMS-SC and determining a status of the device trigger replace request responsive to an indication from the SMS-SC of a success or failure to replace the first trigger message with the second trigger message. The techniques may also include sending a DAA command to the SCS through the Tsp interface. The DAA command may include a Device-Notification AVP having the UE identifier, the SCS-Identifier, the Reference-Number AVP, the Old-Reference-Number AVP, the Action-Type AVP and a Request-Status AVP set to a value to indicate success or failure of the device trigger replace request.

FIG. 1 illustrates an example system 100. In some examples, system 100 may be arranged for supporting MTC or M2M communications and is shown in FIG. 1 as including a radio access network (RAN) 110. RAN 110 may be capable of providing UE 112 access to a communications network. UE 112 may include an MTC UE application 114. An Um/Uu/LTE-Uu interface 116 at UE 112 may provide a signaling interface between a domain of UE 112 and an access domain associated and/or managed by RAN 110. RAN 110 may be coupled to a mobile switching center (MSC) 120, a mobile management entity (MME) 122, a serving general packet radio service (GPRS) support node (SGSN) 124 and a serving gateway (S-GW) 126. According to some examples, system 100 may be divided into a home public land mobile network (HPLMN) 170 and a visited public land mobile network (VPLMN) 172.

In some examples, MSC 120 may act like a switching node within a PSTN or ISDN and may also provide additional functionality to enable support of a mobile user or UE such as UE 112. The additional functionality may include registration, authentication, call location, inter-MSC handovers and call routing to the mobile subscriber or UE.

According to some examples, MME 122 may be arranged as a control-node and may be responsible for idle mode UE tracking and paging procedures including retransmissions. MME 122 may be involved in bearer activation/deactivation processes and may also be responsible for choosing S-GW 126 for UE 112 upon initial attach and at time of intra-LTE handover involving Core Network (CN) node relocation.

In some examples, SGSN 124 may be responsible for the delivery of data packets from and to UEs within its geographical service area. For these examples, SGSN 124 handles packet routing and transfer, mobility management (attach/detach and location management), logical link management, and authentication and charging functions. S-GW 126 may route and forward user data packets, while also acting as a mobility anchor for a user plane during inter-eNodeB (eNB) handovers and as an anchor for mobility between LTE and other 3GPP technologies.

According to some examples, as shown in FIG. 1, S-GW 126 may be coupled to a gateway GPRS support node/packet gateway (GGSN/PGW) 130. For these examples, GGSN 130 may manage internetworking between a GPRS network and external packet switched networks, like the Internet or X.25 networks. GGSN 130 may also enable mobility of a user terminal in GPRS/UMTS networks and may maintain routing to tunnel protocol data units (PDUs) for servicing a particular UE such as UE 112. PGW 130 may provide connectivity from UE 112 to external packet data networks by being a point of exit and entry of traffic for UE 112. P-GW 130 may perform policy enforcement, packet filtering for a UE such as UE 112, charging support, lawful interception and packet screening. PGW 130 may also act as an anchor for mobility between 3GPP and non-3GPP technologies, such as WiMAX and 3GPP2.

In some examples, as shown in FIG. 1, MSC 120, MME 122 and the SGSN 124 may be coupled to an MTC-IWF 150. For these examples, MTC-IWF 150 may interface with other 3GPP entities for providing various MTC services. For example, MTC-IFW 150 may support device trigger functionality over Tsp and T4 reference points and may generate charging data records (CDRs) for supported device triggers. While examples are described herein using device or trigger messages, other types of messaging may also be used according to other examples, e.g., small data transmissions, etc.

According to some examples, as shown in FIG. 1, MTC-IWF 150 may be coupled to a charging data function/charging gateway function (CDF/CGF) 140, a 3GPP home subscriber server (HSS) 138, and a short message service-service center/gateway mobile switching center/interworking mobile switching center (SMS-SC/GMSC/IWMSC) 134. For these examples, charging function addresses may be addresses distributed to IP multimedia subsystem (IMS) entities and provide a common location for an entity to send charging information. CDF addresses are used for offline billing and Online Charging Function (OCF) for online billing. CDF 140 may collect accounting information, and build a Call Detail Record (CDR), which is sent to the billing system (BS) of the domain. CGF 140 may listen to messages providing charging data that may be sent from GPRS support nodes (GSNs). CGF 140 may retrieve CDRs from the GSNs. HSS 138 may maintain a master database for a given user. The HSS 138 may be the entity maintaining subscription-related information to support those network entities actually handling calls/sessions.

In some examples, as shown in FIG. 1, SMS-SC/GMSC/IWMSC 134 include SMS-SC, SMS-GMSC and SMS-IWMSC. SMS-SC 134 may act as a store and forward center for SMS messages. SMS-GMSC 134 and SMS-IWMSC 134 may connect SMS-SC 134 to the GPRS network. SMS-GMSC 134 and SMS-IWMSC 134 may be connected to the SGSN through connection 178 to enable GPRS UEs such as UE 112 to send and receive SMS messages through, for example, SGSN 124. SMS-IWMSC 134 may receive SMS messages from a public land mobile network (PLMN) and submit these SMS messages to a receiving SMS-SC such as SMS-SC 134. According to some examples, as shown in FIG. 1, SMS-SC/GMSC/IWMSC 134 may also be coupled to MSC 120 via connection 174 and to MME 122 via connection 176. SMS-SC/GMSC/IWMSC 134 may be further coupled to an Internet Protocol-Short-Message-Gateway (IP-SM-GW) 132 and short message entities (SME) 136. IP-SM-GW 132 may provide the protocol interworking for submission of short messages. SME 136 may include network entities, e.g., mobile stations, cell phones, UEs, that can send/receive short messages.

According to some examples, MTC-IWF 150 may be further coupled to a services capability server (SCS) 160. For these examples, SCS 160 may connect MTC application servers such as application server (AS) 162 to the 3GPP network to enable these application servers to communicate through specific 3GPP defined services with UE 112 and with MTC-IWF 150. SCS 160 may offer capabilities for use by one or multiple application servers such as AS 162. Other types of application servers such as AS 164 may couple to GGSN/PGW 130. Thus, as shown in FIG. 1, AS 164 may connect directly to the 3GPP network in order to perform direct user plane communications with UE 112 without use of SCS 160. However, SCS 160 may provide value added services for MTC and perform user plane and/or control plane communication with UE 112.

In some examples, a Tsp interface such as Tsp interface 188 may function as an inter-domain interface for control plane communication. For these examples, Tsp interface 188 may be used for SCS 160 to deliver a device trigger request included in a trigger message to MTC-IWF 150 and thus may allow MTC-IWF 150 to receive device trigger requests from SCS 160. As described more below, MTC-IWF 150 may include logic and/or features capable of reporting acceptance/success (or non-acceptance/failure) of the device trigger request. In some example, a Tsp interface such as Tsp interface 188 may be implemented as set of APIs (Application Programming Interface).

According to some examples, Tsms interface 180 may be used to send a trigger message to an MTC UE such as UE 112. The trigger message may be encapsulated in a Mobile Terminating-SMS (MT-SMS) as an over-the-top application by any network entity (e.g., SCS 160) acting as an SME. The T4 interface 182 may be used to transfer the trigger message from MTC-IWF 150 to SMS-SC 160, provides serving node's information corresponding to an international mobile subscriber identity (IMSI), and reports the success or failure of delivering the trigger message to UE 112. S6m interface 184 may map mobile subscriber integrated services digital network-number (MSISDN) or external identifier (external-Id) assigned to or associated with UE 112 to IMSI. The map to MSISDN or external-Id may resolve serving node identities of UE 112.

According to some examples, as shown in FIG. 1, T5a 156, T5b 154 and T5c 152 reference points may connect MTC-IWF 150 to serving SGSN 124, MTC-IWF 150 to serving MME 122 or MTC-IWF 150 to serving MSC 120, respectively. T5a 156, T5b 154 and T5c 152 reference points may also support device trigger functionality including transfer of a device trigger request included in a trigger message to MSC 120, MME 122 or SGSN 124, reporting to MTC-IWF 150 the success or failure of delivering the trigger message to UE 112 or providing MME 122/SGSN 124 congestion/load information to MTC-IWF 150. Gi/SGi interface 166 may provide an interface into packet data networks (PDNs). SGi 166 may be an interface to an IP PDN and Gi 166 may be an interface to an external PDN (e.g., Internet) and may contain end-user's IP point of presence. Rf/Ga interface 186 may provide an interface between MTC-IWF 150 and CDF/CGF 140. In some examples, Rf interface 186 may provide access to CTF 140 of the CDF/CGF 140 and Ga interface 186 may provide access to CGF 140 of CDF/CGF 140.

In some examples, end-to-end services between the MTC Applications at UE 112 (e.g., MTC UE Application 114) and MTC or M2M applications provided at AS 162 in an external network may use services provided by a 3GPP system, and optionally services provided by SCS 160. For these examples, the 3GPP system may provide transport and communication services, including 3GPP bearer services, e.g., IMS and SMS, and various optimizations, that can facilitate MTC or M2M types of services. As mentioned above, SCS 160 may couple AS 162 to the 3GPP network to enable AS 162 to communicate through specific 3GPP defined services with UE 112 and with MTC-IWF 150. For example, as described more below, MTC-IWF 150 may be arranged to support reception of a Device-Action-Request (DAR) command from SCS 160 that may be associated with a trigger message or request destined for UE 112. MTC-IWF 150 may report to SCS 160 acceptance or non-acceptance of the request, reporting to SCS 160 success or failure of the request, if known and may provide load control information to SCS 160 as part of the response to the DAR command via a Device-Action-Answer (DAA) command.

According to some examples, MTC-IWF 150 may transmit or forward an SMS request in terms of relaying a trigger message to eventually cause MTC device triggering at UE 112. For example, MTC device triggering may start from an MTC application at AS 162. The MTC application at AS 162 may communicate with SCS 160 to initiate the MTC device triggering. SCS 160 may then transmit a DAR command that may include a request for device triggering to MTC-IWF 150 via the Tsp interface 188. MTC-IWF 150 may then send a DAA command to SCS 160 that may include information to indicate a status of the request included in the DAR command.

In some examples, a DAR command may be used between MTC-IWF 150 and SCS 160 to support a device action request procedure. For these examples the DAR command may be sent by SCS 160 to MTC-IWF 150 and may indicate a request for an action that may include a device trigger recall/replace request to recall/replace a first (old) trigger message for MTC device triggering that may have been previously sent to UE 112. Responsive to the DAR command, MTC-IWF 150 may initiate a procedure to recall/replace the first (old) trigger message with SMS-SC 160 through T4 182 reference point. According to some examples, SMS-SC 160 may send MTC-IWF 150 a response message that may indicate if the first (old) trigger message to be recalled/replaced is pending at the SMS-SC 160 or has been delivered to UE 112 with failure. SMS-SC 160 may send to MTC-IWF 150 an indication that the first (old) trigger message has been successfully replaced with a second (new) trigger message or recalled (deleted). SMS-SC 160 may also send MTC-IWF 150 a report that indicates the first (old) trigger message has been replaced/recalled. MTC-IWF 150 may then send a DAA command to SCS 160 to indicate the status of the recall/replace request indicated in the previously received DAR command.

According to some examples, a similar message format for a DAR command and subsequent DAA command may be used for various types of device trigger requests to include device recall/trigger replace requests. For these examples, Device-Action and Device Notification Attribute Value Pairs (AVPs) may have values set to provide information relevant to the DAR/DAA commands and may further have Action-Type AVPs to indicate a particular device trigger request (e.g., these AVPs may vary slightly between device trigger recall and device trigger replace requests). Data delivered between MTC-IWF 150 and SCS 160 may be provided in the form of AVPs having set values associated with a payload for the data.

In some examples, rather than having a general device trigger request DAR command including a Device Action AVP that further has an Action-Type AVP to indicate a particular device trigger request. A Device-Action-Recall-Request (DARR) command may be used for a device trigger recall request by SCS 160 to MTC-IWF 150 and an associated Device-Action-Recall-Answer (DARA) command may be used for indicating a status of the device trigger recall request to SCS 160. Also, a Device-Action-Replace-Request (DARpR) command may be used for a device trigger replace request by SCS 160 to MTC-IWF 150 and an associated Device-Action-Replace-Answer (DARpA) command may be used for indicating a status of the device trigger replace request to SCS 160.

According to some examples, a protocol may be used with the various commands mentioned above that may include, but is not limited to the Diameter Base Protocol as specified in Request for Comments (RFC) 3588, published in September 2003 by the Internet Engineering Task Force (IETF). Hereinafter referred to as RFC 3588. Table I shows a list of the various commands mentioned above to include an assigned Diameter Header code value. For the examples shown in Table I, Diameter Header code values for DAR and DAA commands may be as specified in a 3GPP publication, entitled Technical Specification Group Core Network and Terminals; Tsp interface protocol between the MTC Interworking Function (MTC-IWF) and Service Capability Server (SCS), Release 12.1.0, published in June of 2014, and/or previous or subsequent releases or versions (hereinafter referred to as 3GPP TS 29.360). Diameter Header codes for DARR, DARA, DARpR and DARpA may be example enhancements of alternative implementations to 3GPP TS 29.368 and may be assigned similar codes as shown below in Table I.

TABLE I

| Command-Name | Abbreviation | Code |
| --- | --- | --- |
| Device-Action-Request | DAR | 8388639 |
| Device-Action-Answer | DAA | 8388639 |
| Device-Action-Recall-Request | DARR | 8388641 |
| Device-Action-Recall-Answer | DARA | 8388641 |
| Device-Action-Replace-Request | DARpR | 8388642 |
| Device-Action-Replace-Answer | DARpA | 8388642 |

In some examples, Table II shows a list of various AVPs that may be included in the commands listed in Table I. At least a portion the AVPs shown in Table II may be Tsp specific Diameter AVPs as specified in 3GPP TS 29.368V12.1.0. The bolded, italicized AVPs shown in Table II may be used with the DARR, DARA, DARpR and DARpA commands shown in Table I and thus may be example enhancement to 3GPP TS 29.368.

TABLE II

| Attribute Name | AVP Code | Description |
| --- | --- | --- |
| Device-Action | 3001 | Used By The SCS To Request A Specific Action For A Device |
| Device-Notification | 3002 | Used By The MTC-IWF To Report Any Action Requested By The SCS |

TABLE II-continued

| Attribute Name | AVP Code | Description |
|---|---|---|
| Trigger-Data | 3003 | Used By the SCS To Supply All Data Required For A Device Trigger Request |
| Payload | 3004 | Contains The Payload To Be Transferred To The Addressed Device or UE |
| Action-Type | 3005 | Informs The MTC-IWF Of What Action Type Is Required In The Request And Also Informs the SCS Of What Action Type Is Reported |
| Priority-Indication | 3006 | Identifies Priority Of The Device Trigger |
| Reference-Number | 3007 | Used To Uniquely Identify A Transaction Or Trigger Message. |
| Request-Status | 3008 | Informs The MTC-IWF Of What Action Type Is Asked For In The Request And Also Informs The SCS Of What Action Type Is Reported |
| Application-Port-Identifier | 3010 | Used To Uniquely Identify The Triggering Application Addressed In the Device |
| Old-Reference-Number | 3011 | Used To Uniquely Identify A Transaction or Trigger Message Which is Intended To Be Replaced |
| *Device-Action-Recall* | *3012* | *Used By the SCS To Request a Recall Of A Transaction or Trigger Message* |
| *Device-Action-Replace* | *3013* | *Used By the SCS To Request a Replace Of An Old Transaction or Message Old Trigger Message With Another Transaction or Trigger* |

In some examples, a Device-Action AVP as shown in Table I may be used by SCS 160 to request a specific action for a device such as UE 112. A Device-Notification AVP may be used by MTC-IWF 150 to report an action requested by SCS 160. An Action-Type AVP may inform MTC-IWF 150 of what action type is to be used in the request and may also inform SCS 160 of what action type is reported. A Request-Status AVP may inform SCS 160 of the status of a device trigger recall/replace request indicated in DAR, DARA or DARpA command previously sent by SCS 160 to MTC-IWF 150. The Request-Status AVP may be included in a DAA command sent by MTC-IWF 150 to SCS 160.

Figure 2:
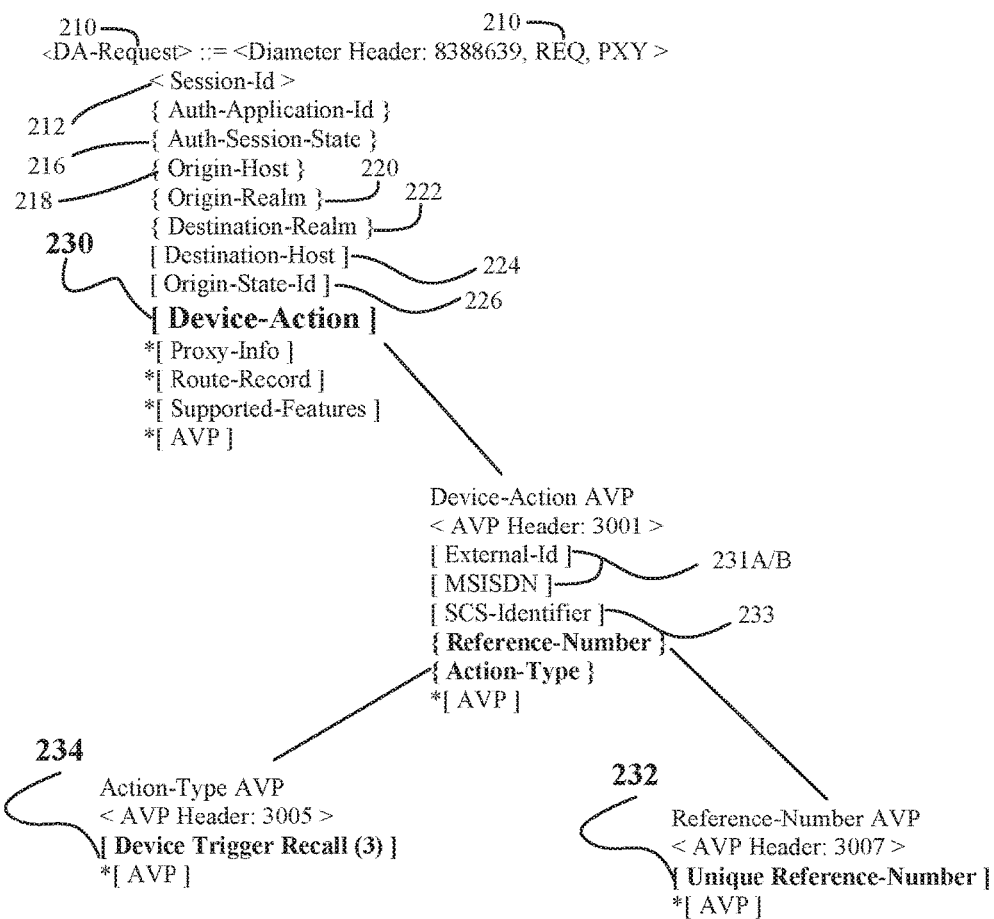
FIG. 2 illustrates an example first command.

FIG. 2 illustrates an example first command. In some examples, as shown in FIG. 2, the first command includes command 200. In FIG. 2, the identification of the type of command for command 200 may be provided with Diameter Header 210 that according to Table I may be a DAR command. Command 200 also includes a Session-Id 212, Auth-Application-Id 214, Auth-Session-State 216, identification of an origin in Origin-Host 218, identification of the origin's realm in Origin-Realm 220, identification of a destination realm in Destination-Realm 222, identification of a destination host in Destination-Host 224, an origin-State ID 226 and a Device-Action AVP 230. Also, as shown in FIG. 2, command 200 may include other fields not given figure numbers for the example shown in FIG. 2 as they may not be applicable to a device trigger recall request.

In some examples, as shown in FIG. 2, in order to request an MTC-IWF (e.g., MTC-IWF 150) to perform a device trigger recall, an SCS (e.g., SCS 160) may send a Device-Action-Request command with the following described AVP values within the Device-Action AVP. Device-Action AVP 230 may have an Action-Type AVP 234 that may be set to a value to indicate a device trigger recall request to recall the old trigger message. As shown in FIG. 2, Action-Type AVP 234 is set to a value of (3). Device-Action AVP 230 may have UE identifier information in either External-Id AVP 231A or MSISDN AVP 231B that may indicate an UE to receive a trigger message initiated by the SCS that generated command 200. Device-Action AVP 230 may also have an SCS identifier in SCS-Identifier AVP 233 including an identity of the SCS that generated command 200. Device-Action AVP 230 may also have a Reference-Number AVP 232 including the assigned reference number the SCS has assigned to the trigger message to be recalled.

FIG. 3 illustrates an example second command. In some examples, as shown in FIG. 3, the second command includes command 300. In FIG. 3, the identification of the type of command for command 300 may be provided with Diameter Header 310 that according to Table I may be a DAA command. Command 300 may include similar to fields 212 to 220 in command 200. Command 300 may also include additional fields that are not assigned figure numbers for the example shown in FIG. 3 as they may not be applicable to an answer to a device trigger recall request.

In some examples, as shown in FIG. 3, after the MTC-IWF has received from the SCS a Device-Action-Request command with device action set to Device Trigger Recall (3), after receiving the Device-Trigger-Answer from an SMS-SC (e.g., SMS-SC 134) the MTC-IWF may confirm the status of a device trigger recall request to the SCS by sending a DAA command and include the following described AVP values within the Device-Notification AVP. Device-Notification AVP 330 may have the same UE identifier information that was included in command 200. Device-Notification AVP 330 may also have the same SCS identifier information. Device-Notification AVP 330 may have an Action-Type AVP 334 that may be set to a value of (3) to indicate a device trigger recall request. Device-Notification AVP 330 may also have a Reference-Number AVP 332 including the reference number of the recalled trigger message initiated by the SCS with the device trigger recall request included in command 200. Device-Notification AVP 330 may have a Request-Status AVP 336 that may be set to a value to indicate status of the device trigger recall request. As shown in FIG. 3, Request-Status AVP 336 may be set to a value of (0) for SUCCESS to indicate success or (111) for RECALLFAIL to indicate that the device trigger recall request has failed for other reasons than ORIGINALMESSAGESENT or (112) for ORIGINALMESSAGESENT to indicates that the message which was intended to be recalled has already been sent.

Figure 4:
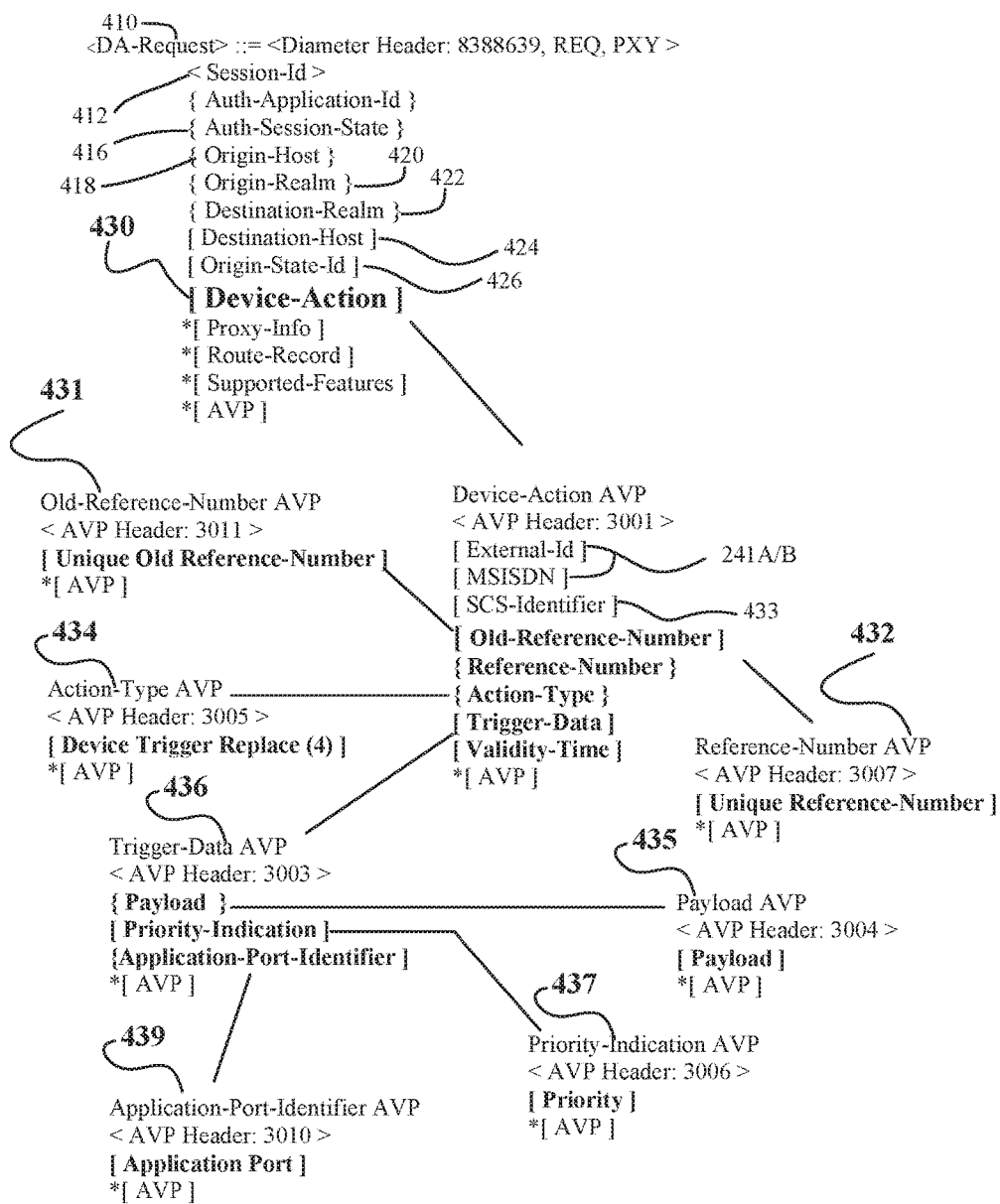
FIG. 4 illustrates an example third command.

FIG. 4 illustrates an example third command. In some examples, as shown in FIG. 4, the third command includes command 400. In FIG. 4, the identification of the type of command for command 400 may be provided with Diameter Header 410 that according to Table I may be a DAR command. For these examples, Command 400 may be for a device trigger replace request and also includes a Session-Id 412, Auth-Application-Id 414, Auth-Session-State 416, Origin-Host 418, Origin-Realm 420, Destination-Realm 422, Destination-Host 424, origin-State ID 426 and a Device-Action AVP 430. Also, as shown in FIG. 4, command 400 may include other fields not given figure numbers for the example shown in FIG. 4 as they may not be applicable to the device trigger replace request.

In some examples, as shown in FIG. 4, in order to request the MTC-IWF to perform a device trigger replace, the SCS sends a DAR command with the following described AVP values within the Device-Action AVP. Device-Action AVP 430 may have an Action-Type AVP 434 that may be set to a value to indicate a device trigger replace request. As shown in FIG. 4, Action-Type AVP 434 is set to a value of (4). Device-Action AVP 430 may have UE identifier information in either External-Id AVP 431A or MSISDN AVP 431B that may indicate an UE to receive a trigger message initiated by the SCS that generated command 400. Device-Action AVP 430 may also have an SCS identifier in SCS-Identifier AVP 433 containing the identity of for the SCS that generated command 400. Device-Action AVP 430 may also have a Reference-Number AVP 432 containing a newly assigned reference number the SCS has assigned to the specific action request. Device-Action AVP 430 may also have an Old Reference-Number AVP 431 containing the assigned reference number by the SCS for the trigger message to be replaced.

According to some examples, Device-Action AVP 430 may also have a Trigger-Data AVP 436 that includes a Payload AVP 435 that may have a data payload to be sent to the UE with the replacement/new trigger message. Trigger-Data AVP 436 may also have a Priority-Indication AVP 437 that may include a priority indication for the replacement/new trigger message. Trigger-Data AVP 436 may also include an Application-Port-Identifier AVP 839 to identify a triggering application at the UE to receive the replacement/new trigger message. The triggering application may be identified by an Application-Port.

In some examples, Device-Action AVP 430, as shown in FIG. 4, may also have a Validity-Time that may indicate a time for which the device trigger replace request is valid. For these examples, the time may include, but is not limited to, a time in seconds.

Figure 5:
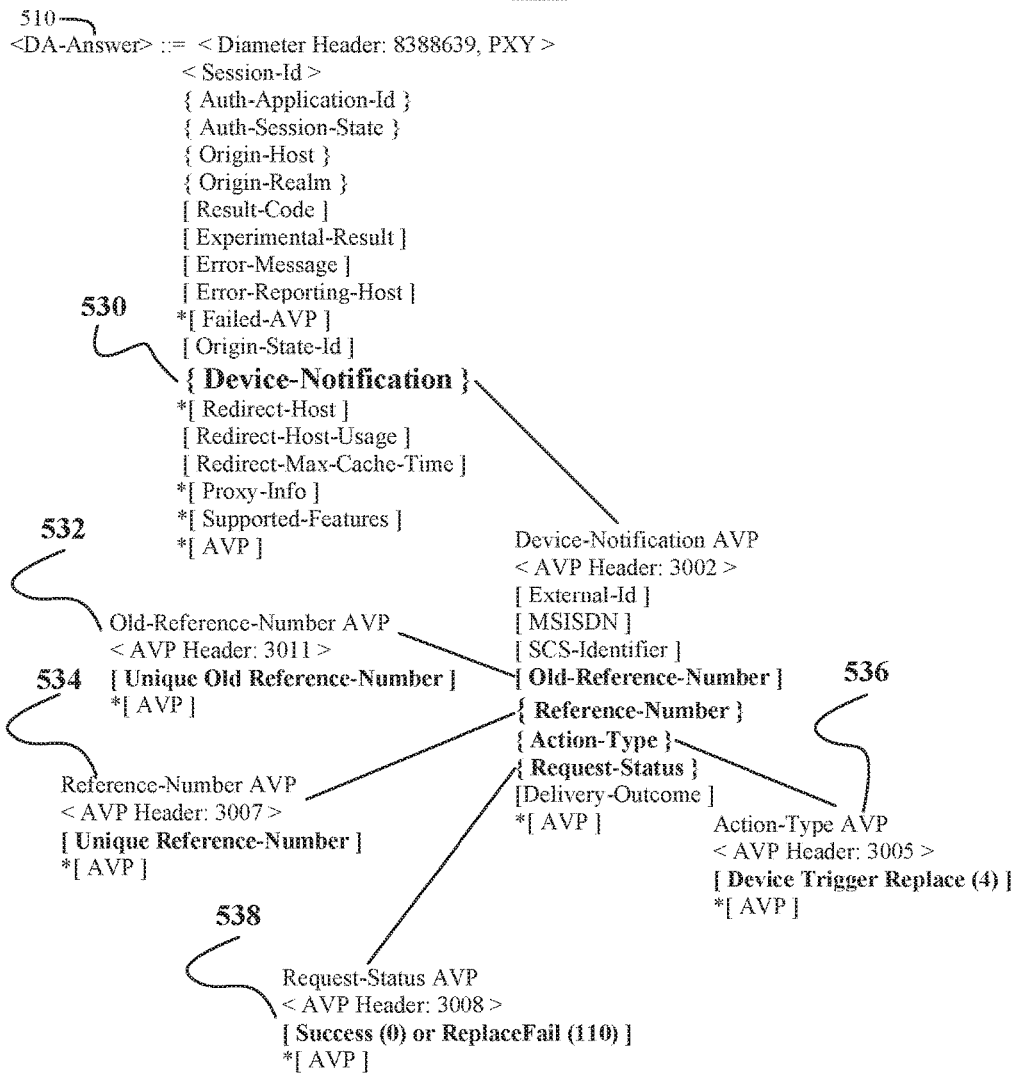
FIG. 5 illustrates an example fourth command.

FIG. 5 illustrates an example fourth command. In some examples, as shown in FIG. 5, the fourth command includes command 500. In FIG. 5, the identification of the type of command for command 500 may be provided with Diameter Header 510 that according to Table I may be a DAA command. Command 500 may include similar to fields 412 to 420 in command 400. Command 500 also include additional fields that are not assigned figure numbers for the example shown in FIG. 5 as they may not be applicable to an answer to a device trigger replace request.

In some examples, as shown in FIG. 5, after the MTC-IWF has received from the SCS a DAR command with device action set to Device Trigger Replace (4), after receiving the Device-Trigger-Answer from SMS-SC the MTC-IWF confirms the status of a Device Trigger Replace Request to the SCS by sending a DAA command and may include the following AVP values within the Device-Notification AVP. Device-Notification AVP 530 may have an Action-Type AVP 534 that may be set to a value of (4) to indicate a device trigger replace request. Device-Notification AVP 530 may have the same UE identifier information that was included in command 400. Device-Notification AVP 530 may also have the same SCS identifier information. Device-Notification AVP 530 may also have a Reference-Number AVP 534 to identify the replacement/new trigger message initiated by SCS with the device trigger replace request included in command 400 for replacing the first trigger message. Device-Notification AVP 530 may also have an Old-Reference-Number AVP 532 containing the reference number previously received from the SCS for the trigger message to be replaced. Device-Notification AVP 530 may have a Request-Status AVP 536 that may be set to a value to indicate success or failure of the device trigger replace request. As shown in FIG. 5, Request-Status AVP 536 may be set to a value of (0) for SUCCESS to indicate success or (110) for REPLACEFAIL to indicate that the device trigger replace request has failed to replace the device trigger indicated by the Old-Reference-Number in the SMS-SC for other reasons than ORIGINALMESSAGESENT i.e. message could not be replaced and new message could not be stored as a new message or (112) for ORIGINALMESSAGESENT to indicates that the message which was intended to be replaced has already been sent.

Figure 6:
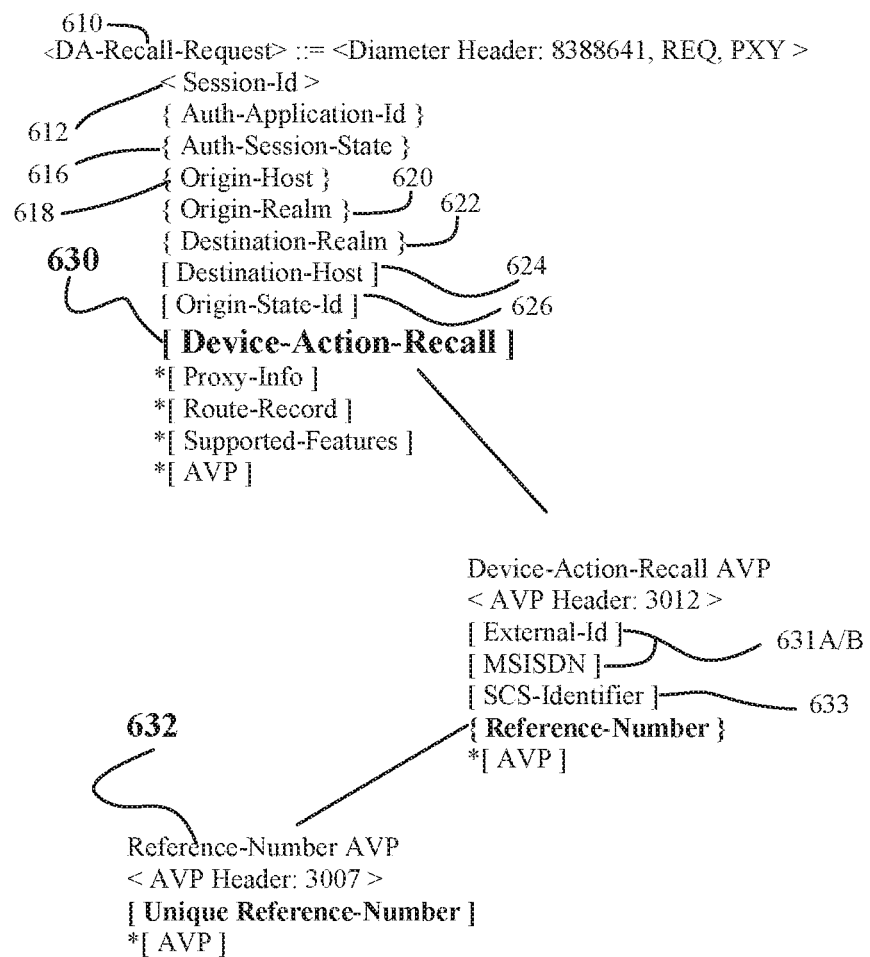
FIG. 6 illustrates an example fifth command.

FIG. 6 illustrates an example fifth command. In some examples, as shown in FIG. 6, the fifth command includes command 600. In FIG. 6, the identification of the type of command for command 600 may be provided with Diameter Header 610 that according to Table I may be a DARR command. Command 600 also includes a Session-Id 612, Auth-Application-Id 614, Auth-Session-State 616, Origin-Host 618, Origin-Realm 620, identification of a destination realm in Destination-Realm 622, identification of a destination host in Destination-Host 624, an origin-State ID 626 and a Device-Action-Recall AVP 630. Also, as shown in FIG. 6, command 600 may include other fields not given figure numbers for the example shown in FIG. 6 as they may not be applicable to a device trigger recall request.

In some examples, as shown in FIG. 6, Device-Action-Recall AVP 630 may have UE identifier information in either External-Id AVP 631A or MSISDN AVP 631B that may indicate an UE to receive a trigger message initiated by the SCS that generated command 600. Device-Action-Recall AVP 630 may also have an SCS identifier in SCS-Identifier AVP 633 for the SCS that generated command 600. Device-Action-Recall AVP 630 may also have a Reference-Number AVP 632 that may be set to identify the trigger message initiated by this SCS.

Figure 7:
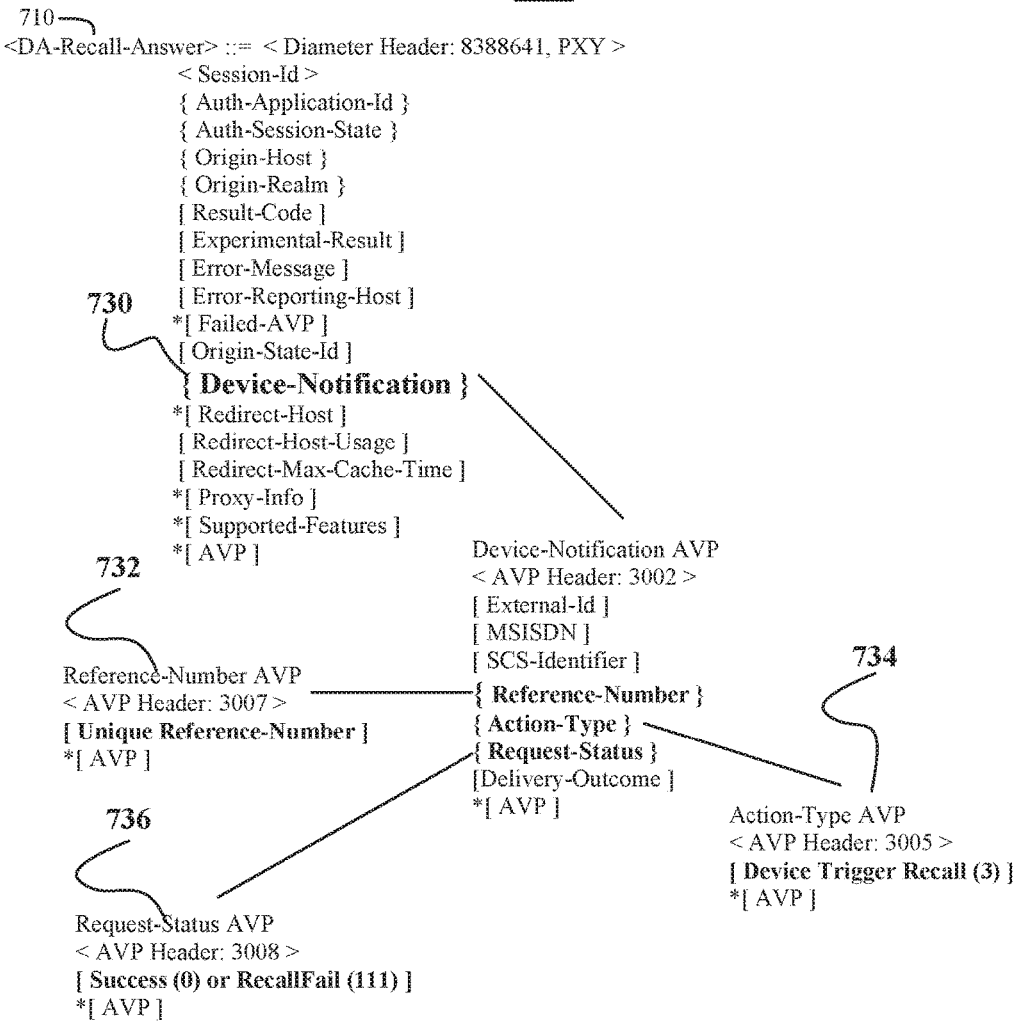
FIG. 7 illustrates an example sixth command.

FIG. 7 illustrates an example sixth command. In some examples, as shown in FIG. 7, the sixth command includes command 700. In FIG. 7, the identification of the type of command for command 700 may be provided with Diameter Header 410 that according to Table I may be a DARA command. Command 700 may include similar to fields 612 to 620 in command 600. Command 700 may also include additional fields that are not assigned figure numbers for the example shown in FIG. 7 as they may not be applicable to an answer to a device trigger recall request.

In some examples, as shown in FIG. 7, Device-Notification AVP 730 may have the same UE identifier information that was included in command 600. Device-Notification AVP 730 may also have the same SCS identifier information. Device-Notification AVP 730 may also have a Reference-Number AVP 732 to identify the trigger message initiated by the SCS with the device trigger recall request included in command 600. Device-Notification AVP 730 may also have an Action-Type AVP 734 that may be set to a value of (3) to indicate a device trigger recall request and a Request-Status AVP 736 that may be set to a value to indicate success or failure of the device trigger recall request. As shown in FIG. 7, Request-Status AVP 736 may be set to a value of (0) for SUCCESS to indicate success or (111) for RECALLFAIL to indicate that the device trigger recall request has failed for other reasons than ORIGINALMESSAGESENT or (112) for ORIGINALMESSAGESENT to indicates that the message which was intended to be recalled has already been sent.

Figure 8:
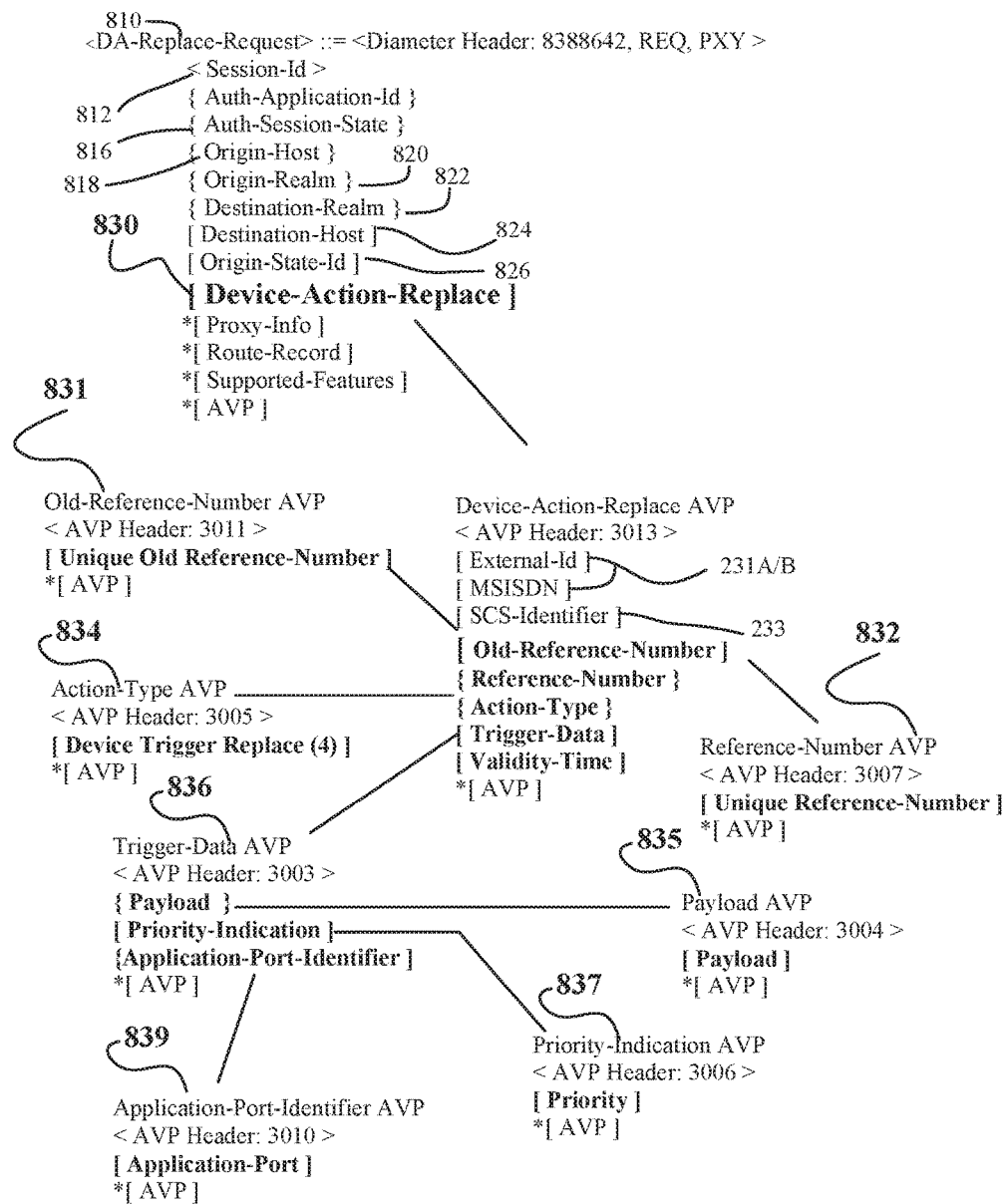
FIG. 8 illustrates an example seventh command.

FIG. 8 illustrates an example seventh command. In some examples, as shown in FIG. 8, the seventh command includes command 800. In FIG. 8, the identification of the type of command for command 800 may be provided with Diameter Header 810 that according to Table I may be a DARpR command. For these examples, Command 800 may be for a device trigger replace request and may also include a Session-Id 812, Auth-Application-Id 814, Auth-Session-State 816, Origin-Host 818, Origin-Realm 820, Destination-Realm 822, Destination-Host 824, origin-State ID 826 and a Device-Action AVP 830. Also, as shown in FIG. 8, command 800 may include other fields not given figure numbers for the example shown in FIG. 8 as they may not be applicable to the device trigger replace request.

In some examples, as shown in FIG. 8, Device-Action-Replace AVP 830 may have UE identifier information in either External-Id AVP 831A or MSISDN AVP 831B that may indicate an UE to receive a trigger message initiated by the SCS that generated command 800. Device-Action-Replace AVP 830 may also have an SCS identifier in SCS-Identifier AVP 833 for the SCS that generated command 800. Device-Action-Replace AVP 830 may also have an Old Reference-Number AVP 831 that may be set to identify a first trigger message initiated by this SCS that is to be replaced with a second trigger message. Reference-Number AVP 832 that may be set to identify the first trigger message. Device-Action-Replace AVP 830 may also have an Action-Type AVP 834 that may be set to a value to indicate a device trigger replace request. As shown in FIG. 8, Action-Type AVP 834 is set to a value of (4).

According to some examples, Device-Action-Replace AVP 830 may also have a Trigger-Data AVP 836 that includes a Payload AVP 835 that may have a data payload to be sent to the UE with the second trigger message. Trigger-Data AVP 836 may also have a Priority-Indication AVP 837 that may include a priority indication for the second trigger message. Trigger-Data AVP 836 may also include an Application-Port-Identifier AVP 839 to identify a triggering application at the UE to receive the second trigger message. The triggering application may be identified by an Application-Port.

In some examples, Device-Action AVP 830, as shown in FIG. 8, may also have a Validity-Time that may indicate a time for which the device trigger replace request is valid. For these examples, the time may include, but is not limited to, a time in seconds.

Figure 9:
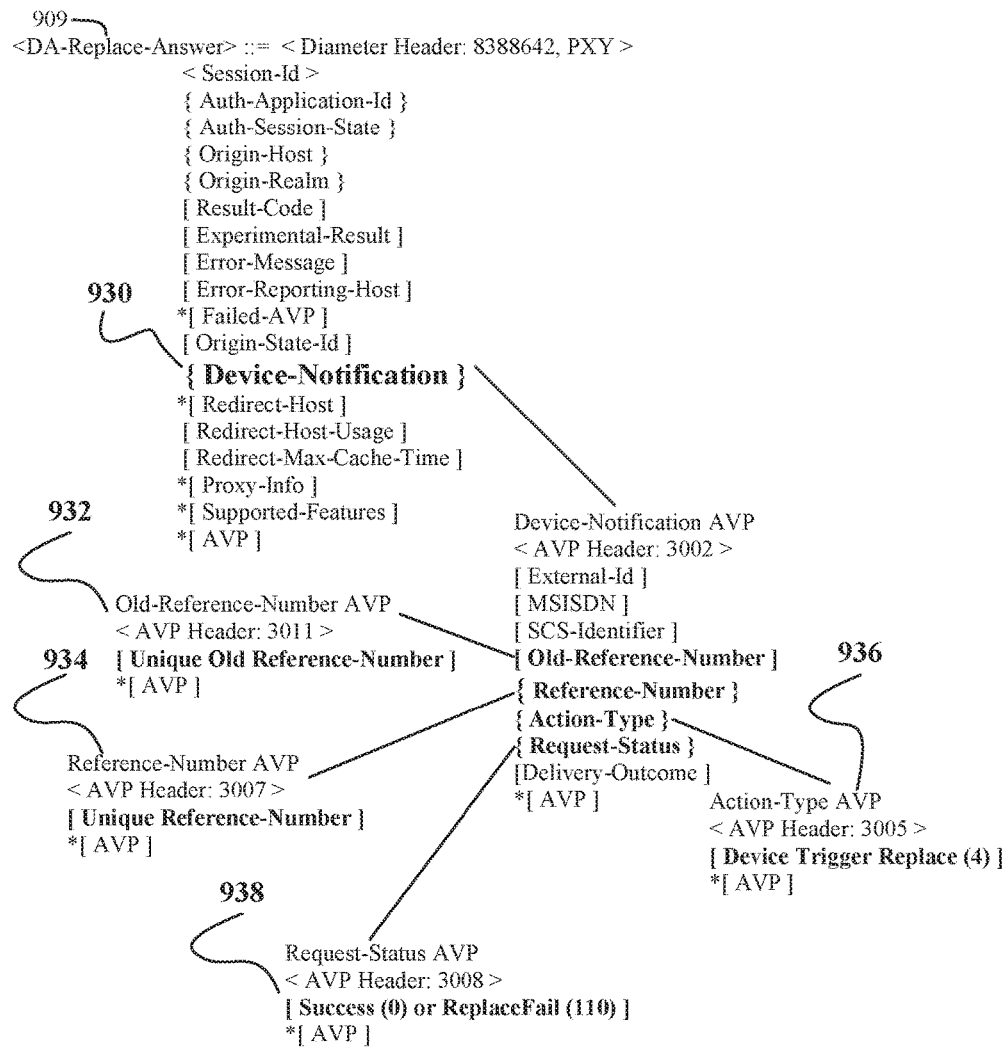
FIG. 9 illustrates an example eighth command.

FIG. 9 illustrates an example eighth command. In some examples, as shown in FIG. 9, the eighth command includes command 900. In FIG. 9, the identification of the type of command for command 900 may be provided with Diameter Header 910 that according to Table I may be a DARpA command. Command 900 may include similar to fields 812 to 820 in command 800. Command 900 also includes additional fields that are not assigned figure numbers for the example shown in FIG. 9 as they may not be applicable to an answer to a device trigger replace request.

In some examples, as shown in FIG. 9, Device-Notification AVP 930 may have the same UE identifier information that was included in command 800. Device-Notification AVP 930 may also have the same SCS identifier information. Device-Notification AVP 930 may also have a Reference-Number AVP 932 to identify the second trigger message initiated by the SCS with the device trigger replace request included in command 400 for replacing the first trigger message. Device-Notification AVP 930 may also have an Action-Type AVP 934 that may be set to a value of (4) to indicate a device trigger replace request and a Request-Status AVP 936 that may be set to a value to indicate success or failure of the device trigger replace request. As shown in FIG. 9, Request-Status AVP 936 may be set to a value of (0) for SUCCESS to indicate success or (110) to for REPLACEFAIL to indicate that the device trigger replace request has failed to replace the device trigger indicated by the Old-Reference-Number in the SMS-SC for other reason than ORIGINALMESSAGESENT (e.g., message could not be replaced and new message could not be stored as a new message or (112) for ORIGINALMESSAGESENT to indicate that the message which was intended to be replaced was already been sent.

Figure 10:
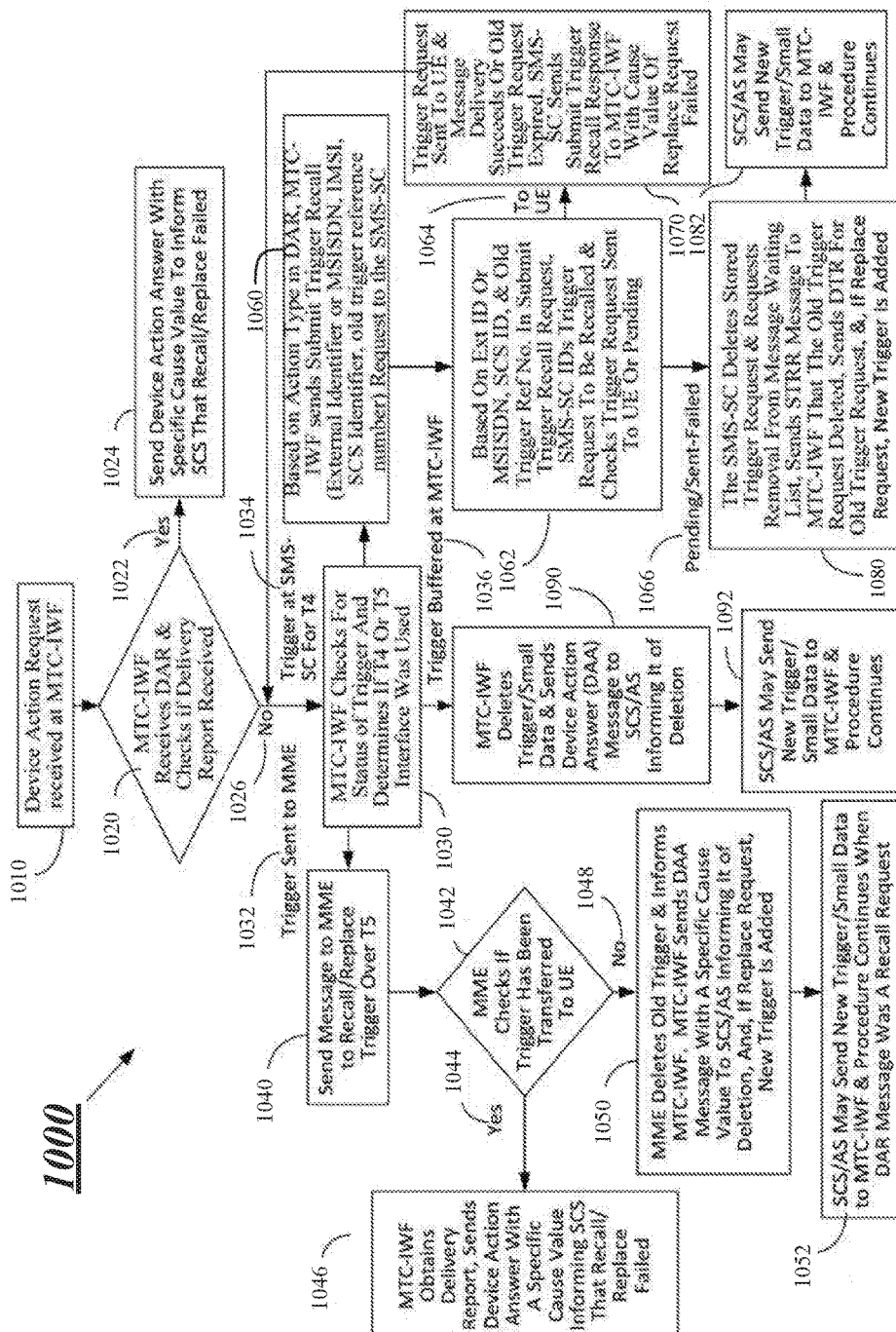
FIG. 10 illustrates an example flow chart for a recall/replacement procedure.

FIG. 10 illustrates an example flow chart for a recall/replacement procedure. In some examples, as shown in FIG. 10, at 1010 a Device-Action Request (DAR) is received at the MTC-IWF. The DAR may include a recall request or a replace request. The recall/replace request may identify an old device trigger according to a device trigger reference number. The recall request may be a request for the deletion of the old device trigger prior to being received by an UE. The replace request may include a new device trigger and new device trigger reference number. The replace request may ask for the old device trigger to be replaced by the new device trigger.

In response to receiving the DAR, at 1020 the MTC-IWF determines whether a delivery report has been received regarding the trigger associated with the received DAR. If a delivery report has been received 1022, this implies that previously submitted trigger has already been processed, therefore the MTC-IWF at 1024 may send a Device-Action Answer (DAA) with specific cause value to the SCS to inform the SCS that the trigger recall/replacement failed. If a delivery report has not been received 1026, the MTC-IWF at 1030 determines the disposition of trigger and determines if the T4 or T5 interface was used for old device trigger delivery. In case of T5 device trigger, at 1032 if the trigger is sent to the MME, the MTC-IWF at 1040 sends a message to the MME to recall/replace the trigger. The MME determines at 1042 whether the trigger has been transferred to the UE. If yes 1044, the MTC-IWF at 1046 obtains a delivery report from the MME indicating the trigger has already been sent to the UE and the MTC-IWF sends the SCS a Device-Action Answer (DAA) with specific cause value to inform the SCS that the recall/replacement failed.

If the MME determines at 1048 that the trigger has been stored at MME and has not been transferred to the UE yet, e.g., the UE was not reachable, or in Idle mode), the MME at 1050 deletes the old device trigger and sends a delivery report to the MTC-IWF indicating deletion of the old device trigger and the MTC-IWF sends a DAA with specific cause value (AVP) to the SCS to inform the SCS of the successful deletion of the old device trigger, and if the DAR was a recall request, a new device trigger request is added. If the DAR was a replace request, at 1052 the SCS may then send a new device trigger request to the MTC-IWF, wherein the processing of the trigger continues.

If the MTC-IWF determines at 1036 that the trigger is still buffered at the MTC-IWF, the MTC-IWF at 1090 deletes the trigger and sends a DAA to the SCS informing the SCS of the deletion. The SCS at 1092 may then send a new device trigger to the MTC-IWF, wherein the processing of the trigger continues.

In case of T4 device trigger at 1034, if the MTC-IWF determines that the trigger has been sent to the SMS-SC, the MTC-IWF at 1060 sends a Submit Trigger Recall (External Identifier or MSISDN, IMSI, SCS Identifier, old device trigger reference number) message to the SMS-SC. Based on the External Identifier or MSISDN, SCS Identifier, and old device trigger reference number in the received Submit Trigger Recall Request, the SMS-SC at 1062 identifies which trigger message is to be recalled and checks if the identified trigger message has been sent to the UE or is pending at SMS-SC.

If the trigger message is pending at SMS-SC or if the trigger message has been sent to the UE but this message delivery fails 1066, the SMS-SC at 1080 deletes the stored trigger message and requests the HSS to remove the SMS-SC address from the Message Waiting List, sends a Submit Trigger Recall Response message to the MTC-IWF to inform that the previously submitted trigger message has been successfully deleted in the SMS-SC, and sends a Trigger Delivery Report for the original trigger message indicating that this message has been recalled, and if DAR was a replace request, the identified new device trigger is added. The SCS at 1082 may then send a new device trigger to the MTC-IWF, wherein the processing of the trigger continues.

If the trigger message has been sent to the UE and this message delivery succeeds or if the original trigger message has already expired at 1064, the SMS-SC at 1070 sends a Submit Trigger Recall Response message to the MTC-IWF with a cause value (AVP) indicating that the replace request failed. For example, due to the successful delivery of the previously submitted trigger message or its expiration failed (e.g., due to the successful delivery of the previously submitted trigger message or its expiration).

Figure 11:
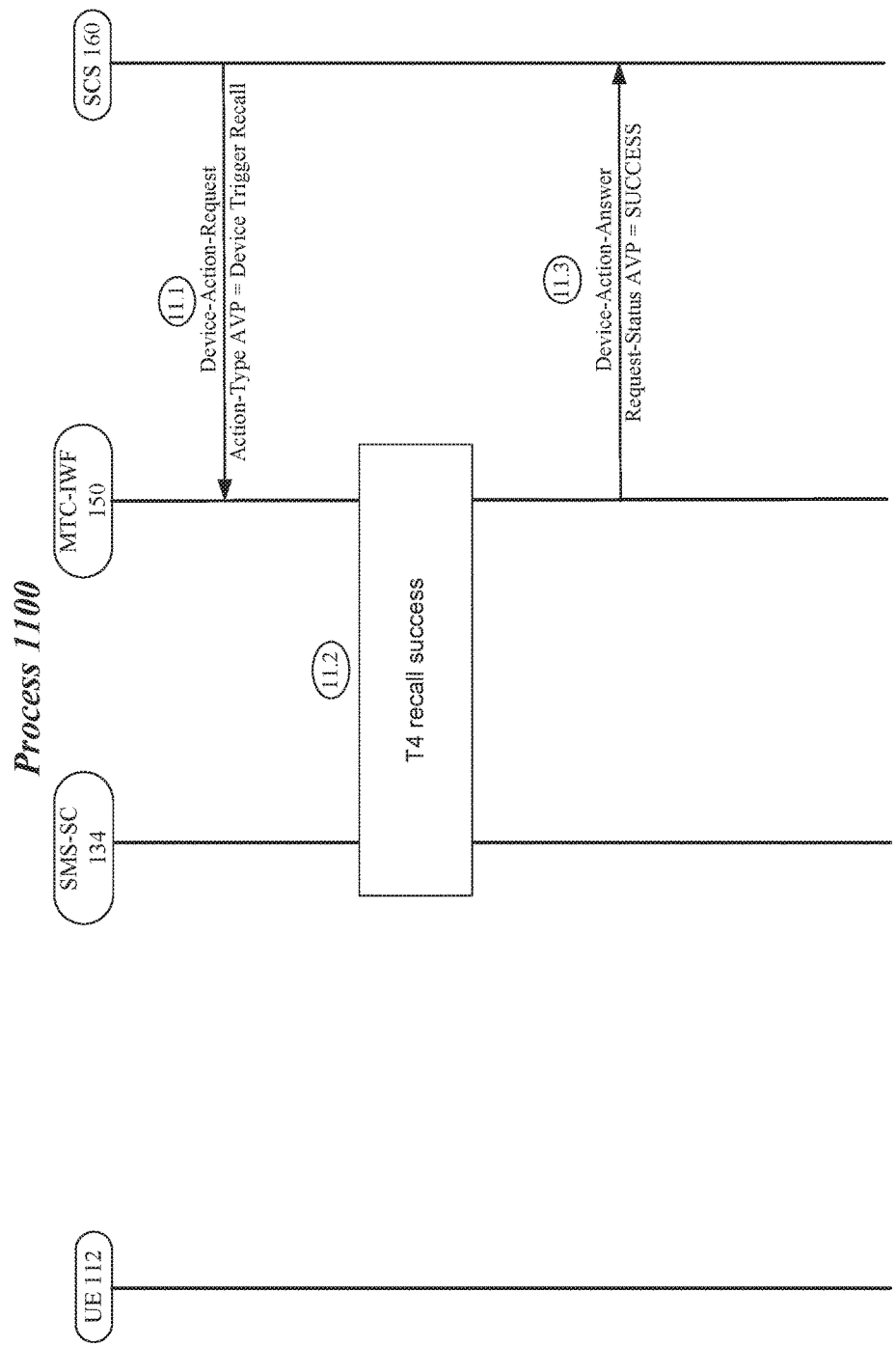
FIG. 11 illustrates an example first process.

FIG. 11 illustrates a first example process. In some examples, as shown in FIG. 11, the first example process includes process 1100. Process 1100 may be for a successful device trigger recall request. For these examples, elements of system 100 as shown in FIG. 1 such as UE 112, SMS-SC 134, MTC-IWF 150 or SCS 160 may be related to process 1100. Also, commands 200 and 300 as shown in FIGS. 2-3 may also be related to process 1100. However, the example process 1100 is not limited to implementations using elements of system 100 or commands 200 and 300 shown in FIGS. 1-3.

Beginning at process 11.1 (Device-Action-Request), logic and/or features at SCS 122 may be capable of sending a Device-Action-Request (DAR) to MTC-IWF. In some examples, the DAR may be in the example format of command 200. The DAR may be sent over Tsp interface 188 from SCS 160 and includes a Device-Action AVP having an UE identifier to indicate that UE 112 is to receive a trigger message that was previously initiated by SCS 160 (e.g., the message to be recalled), an SCS-Identifier for SCS 160, a Reference-Number AVP set to identify the trigger message to be recalled and an Action-Type that indicates a device trigger recall request (e.g., a value of (3)).

Moving to process 11.2 (T4 recall success), logic and/or features at MTC-IWF 150 may be arranged to select T4 for the trigger recall and may perform a recall procedure with SMS-SC 134 and determines an outcome of the trigger recall is a successful recall of the trigger message.

Moving to process 11.3 (Device-Action-Answer), logic and/or features at MTC-IWF 150 may be capable of sending a Device-Action-Answer (DAA) to SCS 160. In some examples, the DAA may be in the example format of command 300. The DAA may be sent over Tsp interface 188 and includes a Device-Notification AVP having the UE identifier for UE 112, the SCS-Identifier for SCS 160, the Reference-Number AVP for the recalled trigger message, the Action-Type AVP that indicates device trigger recall and a Request-Status AVP set to a value to indicate SUCCESS of the trigger recall. Process 1100 may then come to an end.

Figure 12:
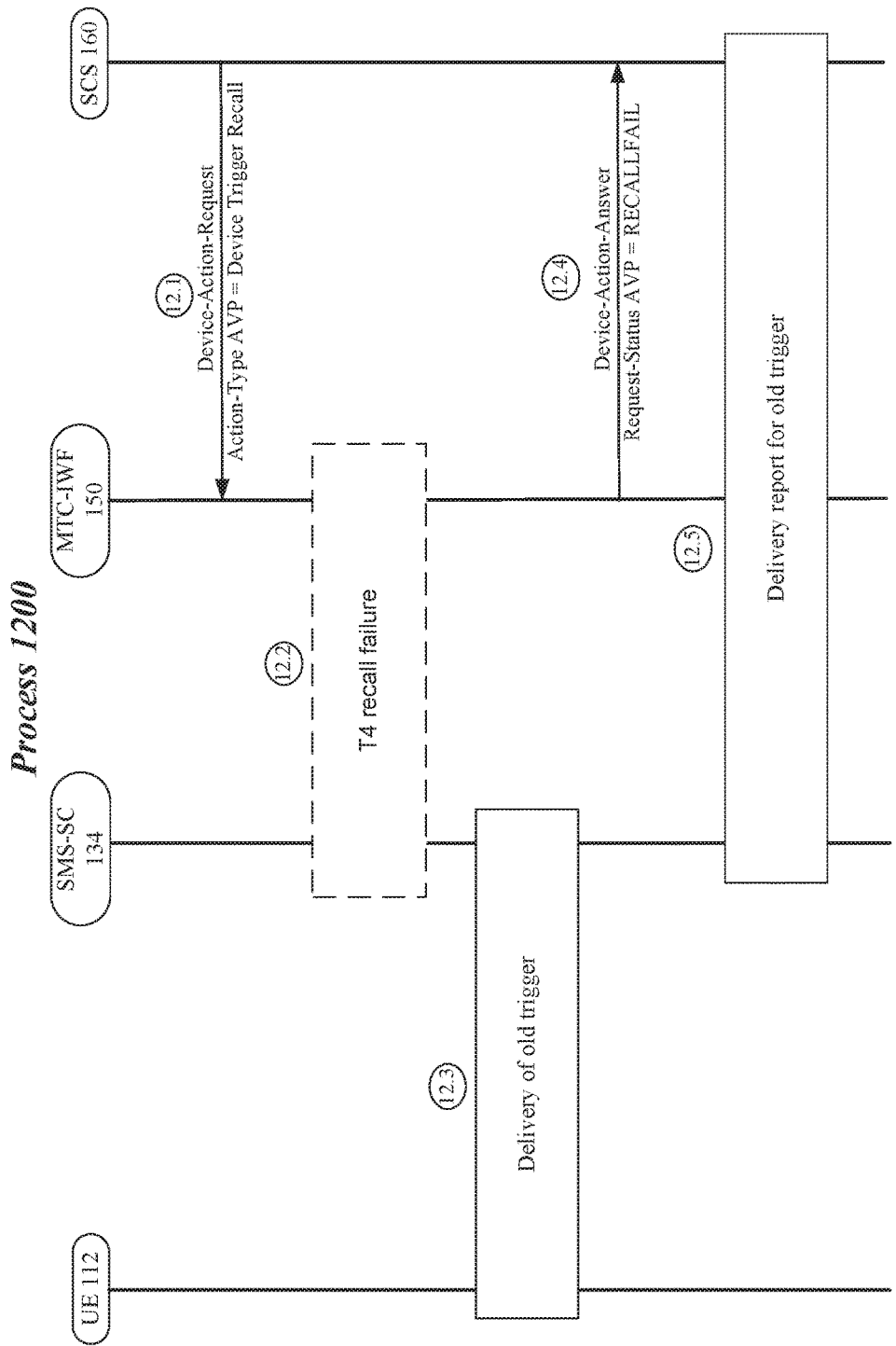
FIG. 12 illustrates an example second process.

FIG. 12 illustrates a second example process. In some examples, as shown in FIG. 12, the second example process includes process 1200. Process 1200 may be for an unsuccessful device trigger recall request. For these examples, elements of system 100 as shown in FIG. 1 such as UE 112, SMS-SC 134, MTC-IWF 150 or SCS 160 may be related to process 1200. Also, commands 200 and 300 as shown in FIGS. 2-3 may also be related to process 1200. However, the example process 1200 is not limited to implementations using elements of system 100 or commands 200 and 300 shown in FIGS. 1-3.

Beginning at process 12.1 (Device-Action-Request), logic and/or features at SCS 160 may be capable of sending a Device-Action-Request (DAR) to MTC-IWF. In some examples, the DAR may be in the example format of command 200. The DAR may be sent over Tsp interface 188 from SCS 160 and includes a Device-Action AVP having an UE identifier to indicate that UE 112 is to receive a trigger message that was previously initiated by SCS 160 (e.g., the message to be recalled), an SCS-Identifier for SCS 160, a Reference-Number AVP set to identify the trigger message to be recalled and an Action-Type that indicates a device trigger recall request (e.g., a value of (3)).

Moving to process 12.2 (T4 recall failure), logic and/or features at MTC-IWF 150 may be arranged to select T4 for the trigger recall and may perform a recall procedure with SMS-SC 134 and determines an outcome of the trigger recall is an unsuccessful recall of the trigger message. Alternatively, MTC-IWF 150 may just reject the device trigger recall request.

Moving to process 12.3 (Delivery of old trigger), SMS-SC 134 may deliver the trigger message to UE 112 that was attempted to be recalled by SCS 160.

Moving to process 12.4 (Device-Action-Answer), logic and/or features at MTC-IWF 150 may be capable of sending a Device-Action-Answer (DAA) to SCS 160. In some examples, the DAA may be in the example format of command 300. The DAA may be sent over Tsp interface 188 and includes a Device-Notification AVP having the UE identifier for UE 112, the SCS-Identifier for SCS 160, the Reference-Number AVP for the recalled trigger message, the Action-Type AVP that indicates device trigger recall and a Request-Status AVP set to a value to indicate failure of the trigger recall.

Moving to process 12.5 (Delivery report for old trigger), SMS-SC 134 may report a delivery outcome for the old trigger message to MTC-IWF 150 that may indicate the old trigger message was either successfully or unsuccessfully delivered. Process 1100 may then come to an end.

Figure 13:
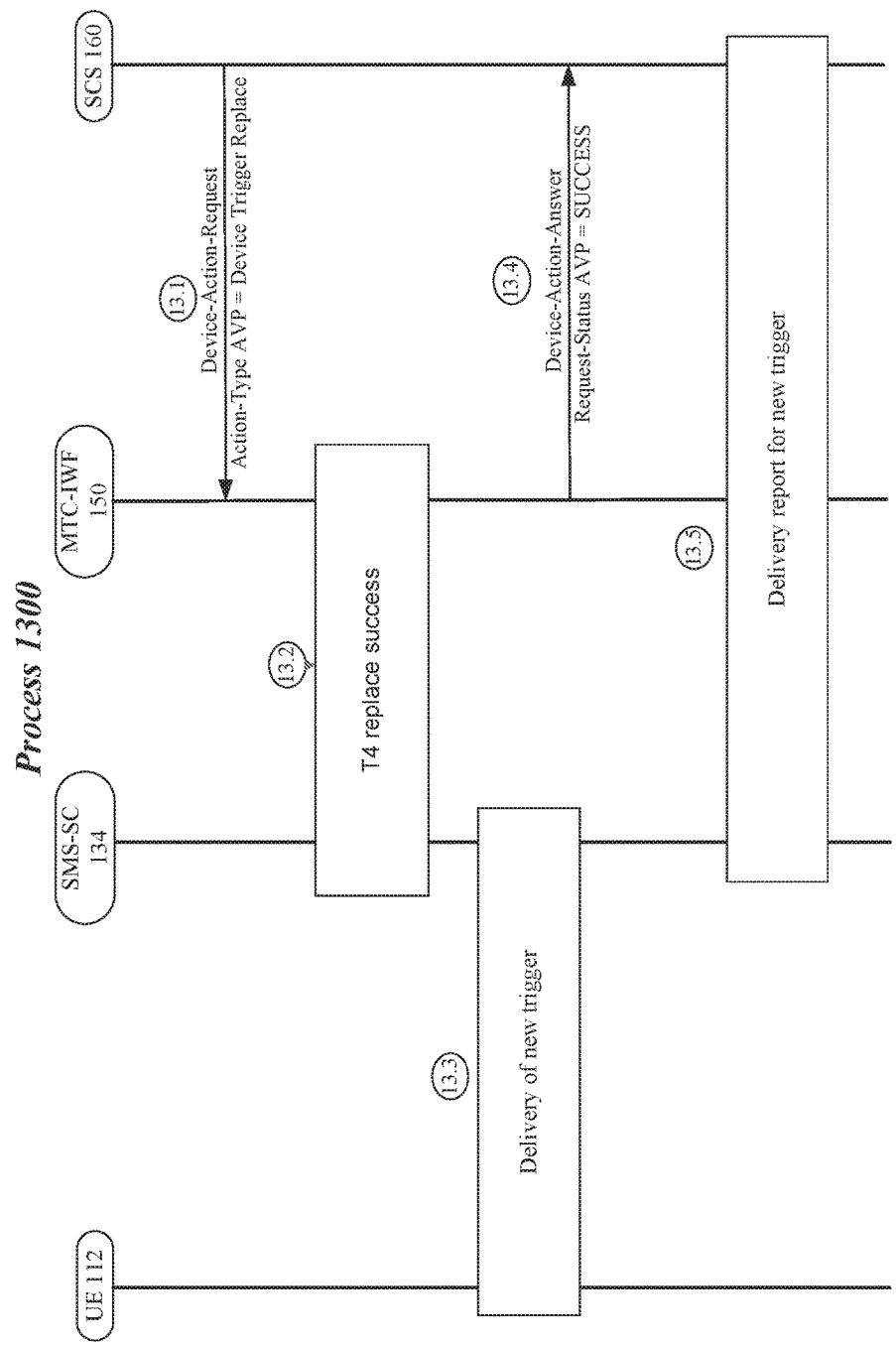
FIG. 13 illustrates an example third process.

FIG. 13 illustrates a third example process. In some examples, as shown in FIG. 13, the third example process includes process 1300. Process 1300 may be for a successful device trigger replace request. For these examples, elements of system 100 as shown in FIG. 1 such as UE 112, SMS-SC 134, MTC-IWF 150 or SCS 160 may be related to process 1300. Also, commands 400 and 500 as shown in FIGS. 4-5 may also be related to process 1300. However, the example process 1300 is not limited to implementations using elements of system 100 or commands 400 and 500 shown in FIGS. 1 and 4-5.

Beginning at process 13.1 (Device-Action-Request), logic and/or features at SCS 160 may be capable of sending a Device-Action-Request (DAR) to MTC-IWF. In some examples, the DAR may be in the example format of command 400. The DAR may be sent over Tsp interface 188 from SCS 160 and includes a Device-Action AVP having an UE identifier to indicate that UE 112 is to receive a first trigger message that was previously initiated by SCS 160 (e.g., the message to be replaced), an SCS-Identifier for SCS 160, an Action-Type that indicates a device trigger replace request (e.g., a value of (4)), a Reference-Number AVP set to identify a second trigger message, and an Old-Reference-Number AVP set to identify the first trigger message.

Moving to process 13.2 (T4 replace success), logic and/or features at MTC-IWF 150 may be arranged to select T4 for replacement of the first trigger message with the second trigger message and may perform a replace procedure with SMS-SC 134. MTC-IWF 150 may determine that an outcome of the replacement is a successful replacement of the first trigger message with the second trigger message.

Moving to process 13.3 (Delivery of new trigger), SMS-SC 134 may deliver the second/new trigger message to UE 112.

Moving to process 13.4 (Device-Action-Answer), logic and/or features at MTC-IWF 150 may be capable of sending a Device-Action-Answer (DAA) to SCS 160. In some examples, the DAA may be in the example format of command 500. The DAA may be sent over Tsp interface 188 to SCS 160 and includes a Device-Notification AVP having the UE identifier for UE 112, the SCS-Identifier for SCS 160, the Reference-Number AVP for the replaced first trigger message, the Action-Type AVP that indicates device trigger replace and a Request-Status AVP set to a value to indicate SUCCESS of the device trigger replace request.

Moving to process 13.5 (Delivery report for new trigger), SMS-SC 134 may report a delivery outcome for the old trigger message to MTC-IWF 150 that may indicate the new/second trigger message was successfully delivered. Process 1300 may then come to an end.

Figure 14:
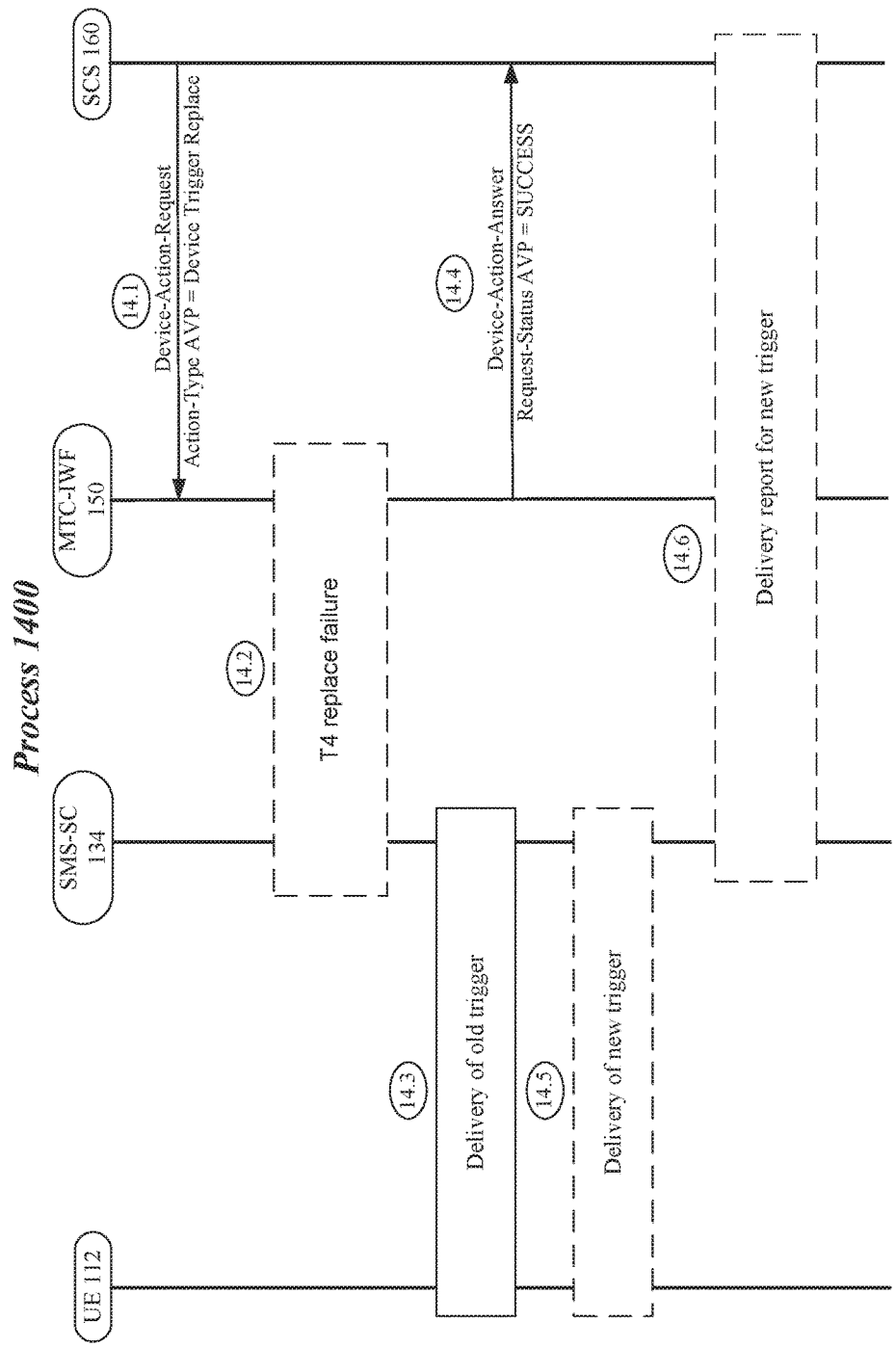
FIG. 14 illustrates an example fourth process.

FIG. 14 illustrates a fourth example process. In some examples, as shown in FIG. 14, the fourth example process includes process 1400. Process 1400 may be for an unsuccessful device trigger replace request. For these examples, elements of system 100 as shown in FIG. 1 such as UE 112, SMS-SC 134, MTC-IWF 150 or SCS 160 may be related to process 1400. Also, commands 400 and 500 as shown in FIGS. 4-5 may also be related to process 1400. However, the example process 1400 is not limited to implementations using elements of system 100 or commands 400 and 500 shown in FIGS. 1 and 4-5.

Beginning at process 14.1 (Device-Action-Request), logic and/or features at SCS 160 may be capable of sending a Device-Action-Request (DAR) to MTC-IWF. In some examples, the DAR may be in the example format of command 400. The DAR may be sent over Tsp interface 188 from SCS 160 and includes a Device-Action AVP having an UE identifier to indicate that UE 112 is to receive a first trigger message that was previously initiated by SCS 160 (e.g., the message to be replaced), an SCS-Identifier for SCS 160, an Action-Type that indicates a device trigger replace request (e.g., a value of (4)), a Reference-Number AVP set to identify a second trigger message, and an Old-Reference-Number AVP set to identify the first trigger message.

Moving to process 14.2 (T4 replace failure), logic and/or features at MTC-IWF 150 may be arranged to select T4 for the trigger recall and may perform a recall procedure with SMS-SC 134 and determines an outcome of the trigger replace is an unsuccessful replace of the first (old) trigger message with the second (new) trigger message. Alternatively, MTC-IWF 150 may just reject the device trigger replace request.

Moving to process 14.3 (Delivery of old trigger), SMS-SC 134 may deliver the old/first trigger message to UE 112.

Moving to process 14.4 (Device-Action-Answer), logic and/or features at MTC-IWF 150 may be capable of sending a Device-Action-Answer (DAA) to SCS 160. In some examples, the DAA may be in the example format of command 500. The DAA may be sent over Tsp interface 188 to SCS 160 and includes a Device-Notification AVP having the UE identifier for UE 112, the SCS-Identifier for SCS 160, the Reference-Number AVP for the replaced first trigger message, the Action-Type AVP that indicates device trigger replace and a Request-Status AVP set to a value to indicate failure of the device trigger replace request.

Moving to process 14.5 (Delivery of new trigger), the new/second trigger message may still be delivered to UE 112 if SMS-SC 134 indicates that the failure was due to the old/first trigger message already being sent/delivered to UE 112.

Moving to process 14.5 (Delivery report for new trigger), SMS-SC 134 may report a delivery outcome for the new/first trigger message to MTC-IWF 150 that may indicate the new/second trigger message was either successfully or unsuccessfully delivered. Process 1400 may then come to an end.

Figure 15:
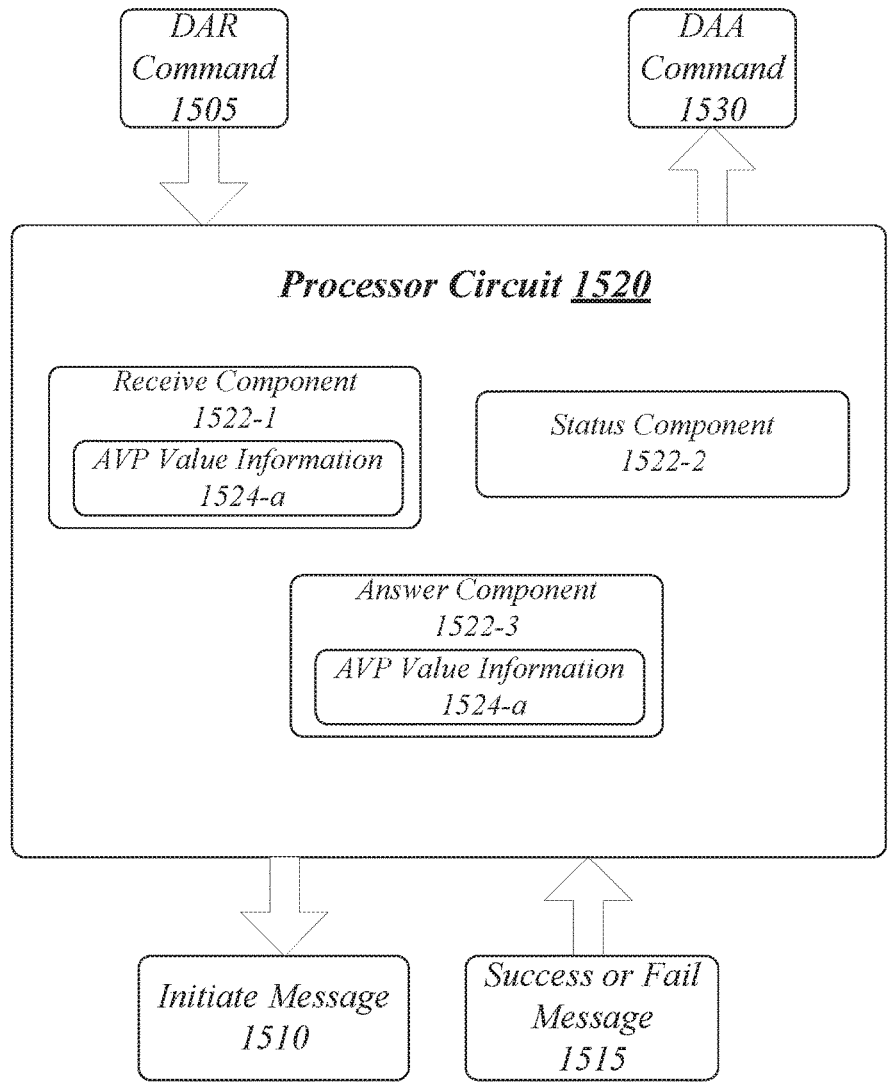
FIG. 15 illustrates an example block diagram for a first apparatus.

FIG. 15 illustrates a block diagram for an example first apparatus. As shown in FIG. 15, the example first apparatus includes apparatus 1500. Although apparatus 1500 shown in FIG. 15 has a limited number of elements in a certain topology, it may be appreciated that the apparatus 1500 may include more or less elements in alternate topologies as desired for a given implementation.

The apparatus 1500 may comprise a computer-implemented apparatus 1500 having a processor circuit 1520 arranged to execute one or more software components 1522-a. It is worthy to note that "a" and "b" and "c" and similar designators as used herein are intended to be variables representing any positive integer. Thus, for example, if an implementation sets a value for a=3, then a complete set of software components 1522-a may include components 1522-1, 1522-2 or 1522-3. The examples are not limited in this context.

According to some examples, apparatus 1500 may be implemented in network equipment such as an MTC-IWF (e.g., MTC-IWF 150) capable of operating in compliance with one or more 3GPP LTE Specifications including LTE-A. The examples are not limited in this context.

In some examples, as shown in FIG. 15, apparatus 1500 includes processor circuit 1520. Processor circuit 1520 may be generally arranged to execute one or more software components 1522-a. The processing circuit 1520 can be any of various commercially available processors, including without limitation an AMD® Athlon®, Duron® and Opteron® processors; ARM® application, embedded and secure processors; Qualcomm® Snapdragon, IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as processing circuit 1520. According to some examples, processor circuit 1520 may also be an application specific integrated circuit (ASIC) and at least some components 1522-a may be implemented as hardware elements of the ASIC.

According to some examples, apparatus 1500 may include a receive component 1522-1. Receive component 1522-1 may be executed by processor circuit 1520 to receive a DAR command (e.g., included in DAR command 1505) from an SCS through a Tsp interface. The DAR command may include a Device-Action AVP having an UE identifier to indicate an UE to receive a trigger message initiated by the SCS and an SC S-Identifier for the SCS. The Device-Action AVP may also have a Reference-Number AVP set to identify the trigger message and an Action-Type AVP set to a value to indicate a device trigger recall request to recall the trigger message. For these examples, receive component 1522-1 may be capable of maintaining and/or accessing AVP value information 1524-a in a memory structure (e.g., a lookup table (LUT)) to determine what values to set at least the Device-Action and the Action-Type AVPs.

In some examples, apparatus 1500 may also include a status component 1522-2. Status component 1522-2 may be executed by processor circuit 1520 to determine a status of the device trigger recall request included in the DAR. Status component 1522-2 may determine the status responsive to one of initiation of a recall procedure with an SMS-SC or a rejection of the initiation of the recall procedure by the MTC-IWF that includes apparatus 1500. The initiation of the recall procedure may be included in initiate message 1510. Also, an indication of success or failure of the recall may be indicated by the SMS-SC in success or fail message 1515. Success or fail message 1515 may be used by status component 1522-2 to determine the status.

In some examples, apparatus 1500 may also include an answer component 1522-3. Answer component 1522-3 may be executed by processor circuit 1520 to send a DAA command (e.g., included in DAA command 1530) to the SCS through the Tsp interface. For these examples, the DAA command may include a Device-Notification AVP having the UE and SCS identifiers received in the DAR. The Device-Notification AVP may also have the Reference-Number AVP for the trigger message that was or was not to be recalled, the Action-Type AVP that indicated the device trigger recall request and a Request-Status AVP set to a value to indicate success or failure of the device trigger recall request. Answer component 1522-2 may have access to AVP value information 1524-a to determine what values to set at least the Device-Notification, the Action-Type and the Request-Status AVPs.

Various components of apparatus 1500 and a device implementing apparatus 1500 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 16 illustrates an example of a logic flow 1600. Logic flow 1600 may be representative of some or all of the operations executed by one or more logic, features, or devices described herein, such as apparatus 1500. More particularly, logic flow 1600 may be implemented by receive component 1522-1, status component 1522-2 or answer component 1522-3.

In the illustrated example shown in FIG. 16, logic flow 1600 at block 1602 may receive, at an MTC-IWF capable of operating in compliance with one or more 3GPP LTE standards including LTE-A, a DAR command from an SCS through a Tsp interface, the DAR command including a Device-Action AVP having an UE identifier to indicate an UE to receive a trigger message initiated by the SCS, an SC S-Identifier for the SCS, a Reference-Number AVP set to identify the trigger message and an Action-Type AVP set to a value to indicate a device trigger recall request to recall the trigger message. In some examples, receive component 1522-1 may receive the DAR command.

According to some examples, logic flow 1600 at block 1604 may determine a status of the device trigger recall request responsive to one of an initiation of a recall procedure with an SMS-SC or a rejection of the initiation of the recall procedure by the MTC-IWF. For these examples, status component 1522-2 may determine the status of the device trigger recall request.

In some examples, logic flow 1600 at block 1606 may send a DAA command to the SCS through the Tsp interface, the DAA command including a Device-Notification AVP having the UE identifier, the SCS-Identifier, the Reference-Number AVP, the Action-Type AVP and a Request-Status AVP set to a value to indicate success or failure of the device trigger recall request. For these examples, answer component 1522-3 may send the DAA command.

FIG. 17 illustrates an embodiment of a storage medium 1700. The storage medium 1700 may comprise an article of manufacture. In some examples, storage medium 1700 may include any non-transitory computer readable medium or machine readable medium, such as an optical, magnetic or semiconductor storage. Storage medium 1700 may store various types of computer executable instructions, such as instructions to implement logic flow 1600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 18:
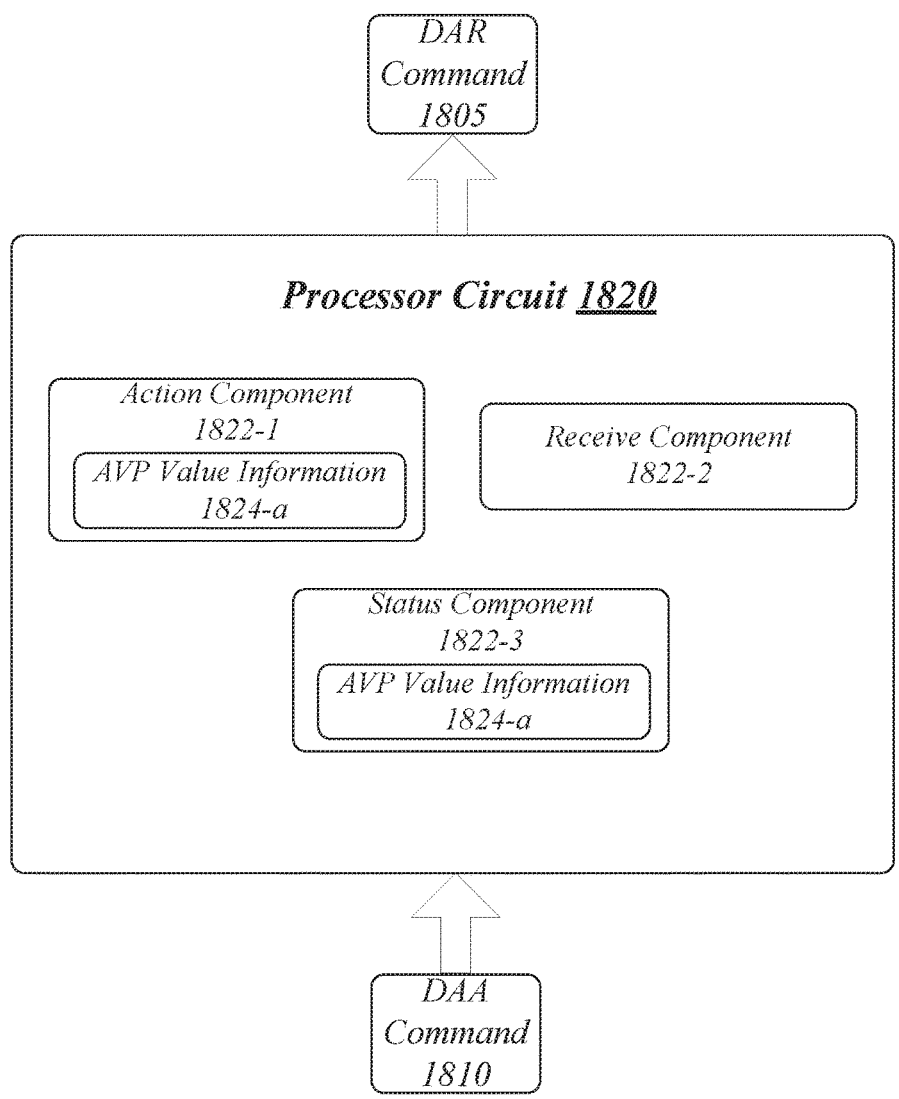
FIG. 18 illustrates an example block diagram for a second apparatus.

FIG. 18 illustrates a block diagram for an example second apparatus. As shown in FIG. 18, the example second apparatus includes apparatus 1800. Although apparatus 1800 shown in FIG. 18 has a limited number of elements in a certain topology, it may be appreciated that the apparatus 1800 may include more or less elements in alternate topologies as desired for a given implementation.

The apparatus 1800 may comprise a computer-implemented apparatus 1800 having a processor circuit 1820 arranged to execute one or more software components 1822-a. It is worthy to note that "a" and "b" and "c" and similar designators as used herein are intended to be variables representing any positive integer. Thus, for example, if an implementation sets a value for a=3, then a complete set of software components 1822-a may include components 1822-1, 1822-2 or 1822-3. The examples are not limited in this context.

According to some examples, apparatus 1800 may be implemented in network equipment such as an SCS (e.g., SCS 160) capable of operating in compliance with one or more 3GPP LTE Specifications including LTE-A in order to couple to an MTC-IWF (e.g., MTC-IWF 150. The examples are not limited in this context.

In some examples, as shown in FIG. 18, apparatus 1800 includes processor circuit 1820. Processor circuit 1820 may be generally arranged to execute one or more software components 1822-a. The processing circuit 1820 can be any of various commercially available processors to include but not limited to the processors mentioned above for apparatus 1500. Also, according to some examples, processor circuit 1820 may also be an ASIC and at least some components 1822-a may be implemented as hardware elements of the ASIC.

According to some examples, apparatus 1800 may be implemented by a first UE and may include an action component 1822-1. Action component 1822-1 may be executed by processor circuit 1820 to send a DAR command (e.g., included in DAR command 1805) to an TC-IWF through a Tsp interface. The DAR command may include a Device-Action AVP having an UE identifier to indicate an UE to receive a first trigger message initiated by the SCS and an SCS-Identifier for the SCS. The Device-Action AVP may also have an Action-Type AVP set to a value to indicate a device trigger replace request to replace the first trigger message with a second trigger message. The Device-Action AVP may also have a Reference-Number AVP set to identify the second trigger message and an Old-Reference-Number to identify the first trigger message. For these examples, action component 1822-1 may be capable of maintaining and/or accessing AVP value information 1824-a in a memory structure (e.g., a LUT) to determine what values to set at least the Device-Action and the Action-Type AVPs.

In some examples, apparatus 1800 may also include a receive component 1822-2. Receive component 1822-2 may be executed by processor circuit 1820 to receive a DAA command (e.g., included in DAA command 1810) from the MTC-IWF through the Tsp interface. For these examples, the DAA command may include a Device-Notification AVP having the UE identifier, SCS-Identifier, the Reference-Number AVP, the Action-Type AVP and a Request-Status AVP set to a value to indicate success or failure of the device trigger replace request.

In some examples, apparatus 1800 may also include a status component 1822-3. Status component 1822-3 may be executed by processor circuit 1820 to determine the status of the device trigger replace request based on the value set in the Request-Status AVP. For these examples, status component 1822-3 may have access to AVP value information 1824-a to determine what the values set in the Request-Status AVP indicate in terms of a successful replace or an unsuccessful replace of the first trigger message with the second trigger message.

Various components of apparatus 1800 and a device implementing apparatus 1800 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 19 illustrates an example of a logic flow 1900. Logic flow 1900 may be representative of some or all of the operations executed by one or more logic, features, or devices described herein, such as apparatus 1800. More particularly, logic flow 1900 may be implemented by action component 1822-1, receive component 1822-2 or status component 1822-3.

In the illustrated example shown in FIG. 19, logic flow 1900 at block 1902 may send, from an SCS capable of operating in compliance with one or more or more 3GPP LTE standards including LTE-A, a DAR command to an MTC-IWF through a Tsp interface, the DAR command including a Device-Action AVP having an UE) identifier to indicate an UE to receive a first trigger message initiated by the SCS, an SCS-Identifier for the SCS, an Action-Type AVP set to a value to indicate a device trigger replace request to replace the first trigger message with a second trigger message, a Reference-Number AVP set to identify the second trigger message and an Old-Reference-Number AVP set to identify the first trigger message. In some examples, action component 1822-1 may send the DAR command.

According to some examples, logic flow 1900 at block 1904 may receive a Device-Action-Answer (DAA) command from the MTC-IWF through the Tsp interface, the DAA command including a Device-Notification AVP having the UE identifier, the SCS-Identifier, the Reference-Number AVP, the Old-Reference-Number AVP, the Action-Type AVP and a Request-Status AVP set to a value to indicate success or failure of the device trigger replace request. For these examples, receive component 1822-2 may receive the DAA command.

In some examples, logic flow 1900 at block 1906 may determine the status of the device trigger replace request based on the value set in the Request-Status AVP. For these examples, status component 1822-3 may determine the status of the device trigger replace request.

FIG. 20 illustrates an embodiment of a storage medium 2000. The storage medium 2000 may comprise an article of manufacture. In some examples, storage medium 2000 may include any non-transitory computer readable medium or machine readable medium, such as an optical, magnetic or semiconductor storage. Storage medium 2000 may store various types of computer executable instructions, such as instructions to implement logic flow 1900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 21:
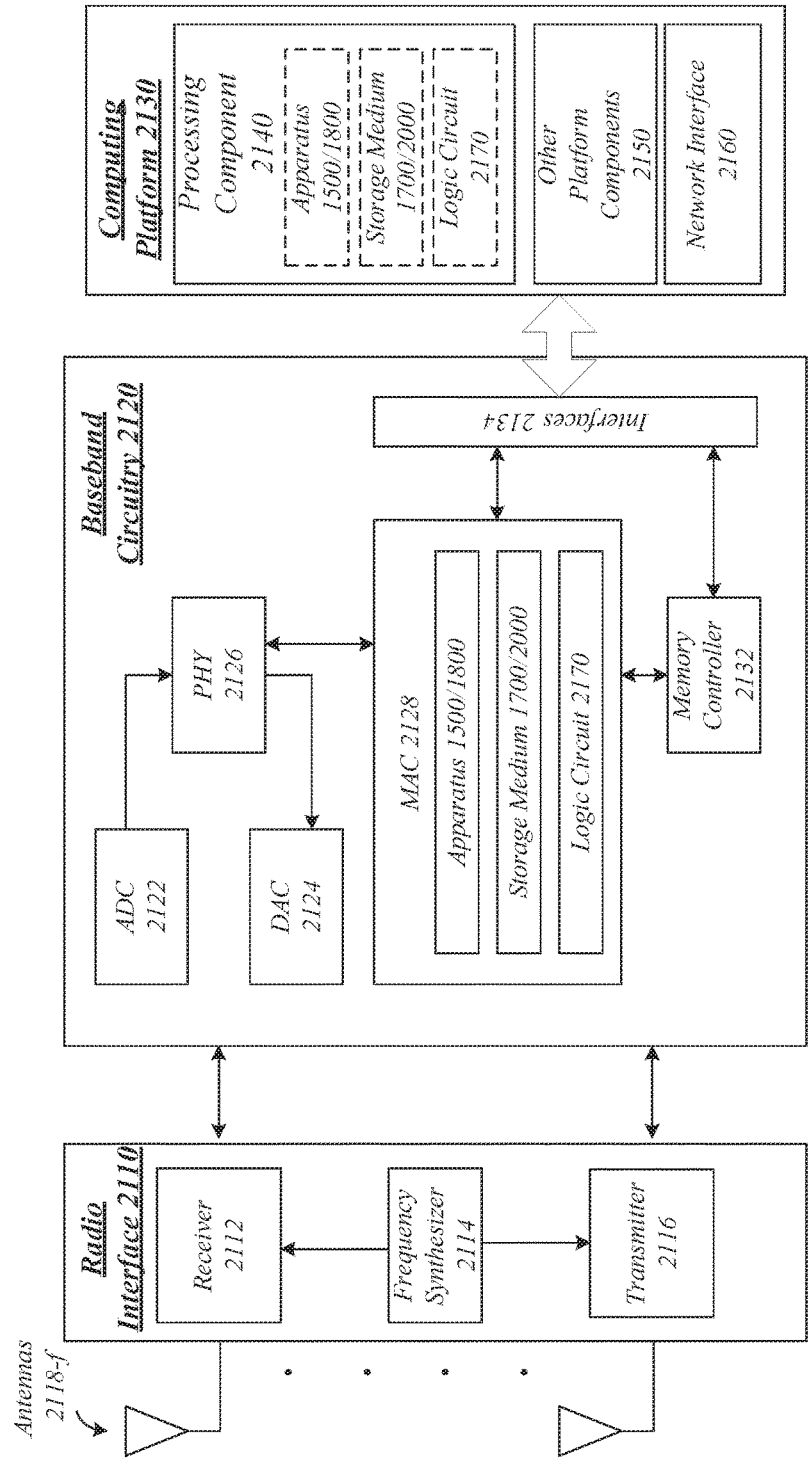
FIG. 21 illustrates an example of a device.

FIG. 21 illustrates an embodiment of a device 2100 for use in a broadband wireless access network. Device 2100 may implement, for example, apparatus 1500/1800, storage medium 1700/2000 and/or a logic circuit 2170. The logic circuit 2170 may include physical circuits to perform operations described for apparatus 1500/1800. As shown in FIG. 21, device 2100 may include a radio interface 2110, baseband circuitry 2120, and computing platform 2130, although examples are not limited to this configuration.

The device 2100 may implement some or all of the structure and/or operations for the apparatus 1500/1800, storage medium 1700/2000 and/or logic circuit 2170 in a single computing entity, such as entirely within a single device. Alternatively, the device 2100 may distribute portions of the structure and/or operations for apparatus 1500/1800, storage medium 1700/2000 and/or logic circuit 2170 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The examples are not limited in this context.

In one embodiment, radio interface 2110 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM) symbols) although the embodiments are not limited to any specific over-the-air interface or modulation scheme. Radio interface 2110 may include, for example, a receiver 2112, a transmitter 2116 and/or a frequency synthesizer 2114. Radio interface 2110 may include bias controls, a crystal oscillator and/or one or more antennas 2118-$f$. In another embodiment, radio interface 2110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 2120 may communicate with radio interface 2110 to process receive and/or transmit signals and may include, for example, an analog-to-digital converter 2122 for down converting received signals, a digital-to-analog converter 2124 for up converting signals for transmission. Further, baseband circuitry 2120 may include a baseband or physical layer (PHY) processing circuit 2126 for PHY link layer processing of respective receive/transmit signals. Baseband circuitry 2120 may include, for example, a processing circuit 2128 for medium access control (MAC)/data link layer processing. Baseband circuitry 2120 may include a memory controller 2132 for communicating with MAC processing circuit 2128 and/or a computing platform 2130, for example, via one or more interfaces 2134.

In some embodiments, PHY processing circuit 2126 may include a frame construction and/or detection module, in combination with additional circuitry such as a buffer memory, to construct and/or deconstruct communication frames (e.g., containing subframes). Alternatively or in addition, MAC processing circuit 2128 may share processing for certain of these functions or perform these processes independent of PHY processing circuit 2126. In some embodiments, MAC and PHY processing may be integrated into a single circuit.

Computing platform 2130 may provide computing functionality for device 2100. As shown, computing platform 2130 may include a processing component 2140. In addition to, or alternatively of, baseband circuitry 2120 of device 2100 may execute processing operations or logic for apparatus 1500/1800, storage medium 1700/2000, and logic circuit 2170 using the processing component 2130. Processing component 2140 (and/or PHY 2126 and/or MAC 2128) may comprise various hardware elements, software elements, or a combination of both. Examples of hardware elements may include devices, logic devices, components, processors, microprocessors, circuits, processor circuits (e.g., processor circuit 1520 or 1820), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 2130 may further include other platform components 2150. Other platform components 2150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 2130 may further include a network interface 2160. In some examples, network interface 2160 may include logic and/or features to support wireless network interfaces as described in one or more 3GPP LTE or LTE-A specifications or standards. For these examples, network interface 2160 may enable an apparatus 1500 or 1800 located at network equipment such as an MTC-IWF or SC to communicate with other devices via network connections.

Device 2100 may be, for example, a computer, a personal computer (PC), a desktop computer, a laptop computer, an ultrabook computer, a smartphone, a tablet computer, a notebook computer, a netbook computer, a work station, a mini-computer, multiprocessor system, processor-based system, wireless access point, or combination thereof. Accordingly, functions and/or specific configurations of device 2100 described herein, may be included or omitted in various embodiments of device 2100, as suitably desired. In some embodiments, device 2100 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 2100 may be implemented using single input single output (SISO) architectures. However, certain implementations may include multiple antennas (e.g., antennas 2118-j) for transmission and/or reception using adaptive antenna techniques for beamforming or spatial division multiple access (SDMA) and/or using multiple input multiple output (MIMO) communication techniques.

The components and features of device 2100 may be implemented using any combination of discrete circuitry, application specific integrated circuits (ASICs), logic gates and/or single chip architectures. Further, the features of device 2100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 2100 shown in the block diagram of FIG. 21 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

Figure 22:
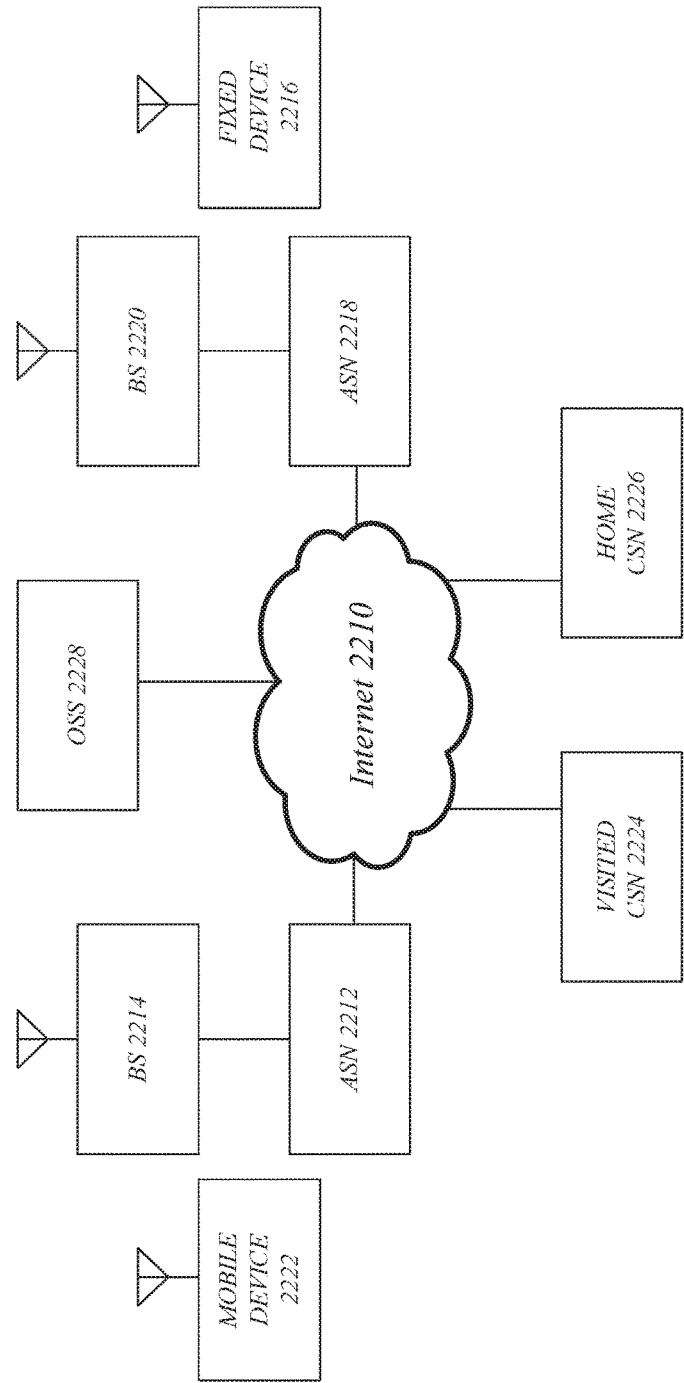
FIG. 22 illustrates an example of a broadband wireless access system.

FIG. 22 illustrates an embodiment of a broadband wireless access system 2200. As shown in FIG. 22, broadband wireless access system 2200 may be an internet protocol (IP) type network comprising an internet 2210 type network or the like that is capable of supporting mobile wireless access and/or fixed wireless access to internet 2210. In one or more embodiments, broadband wireless access system 2200 may comprise any type of orthogonal frequency division multiple access (OFDMA) and/or multiple single carrier frequency division multiple access (multiple SC-FDMA) based wireless network, such as a system compliant with one or more of the 3GPP LTE Specifications and/or IEEE 802.16 Standards, and the scope of this disclosure is not limited in these respects.

In the exemplary broadband wireless access system 2200, access service networks (ASN) 2214, 2218 are capable of coupling with base stations (BS) 2214, 2220 (RRHs or eNBs), respectively, to provide wireless communication between one or more fixed devices 2216 and internet 2210, or one or more mobile devices 2222 and Internet 2210. One example of a fixed device 2216 and a mobile device 2222 is UE 112, with the fixed device 2216 comprising a stationary version of UE 112 and the mobile device 2222 comprising a mobile version of UE 122. ASN 2212 may implement profiles that are capable of defining the mapping of network functions to one or more physical entities on broadband wireless access system 2200. Base stations 2214, 2220 (or eNBs) may comprise radio equipment to provide RF communication with fixed device 2216 and mobile device 2222, such as described with reference to device 2200, and may comprise, for example, the PHY, MAC, RLC or PDCP layer equipment in compliance with a 3GPP LTE Specification or an IEEE 802.16 Standard. Base stations 2214, 2220 (or eNBs) may further comprise an IP backplane to couple to Internet 2210 via ASN 2212, 2218, respectively, although the scope of the claimed subject matter is not limited in these respects.

Broadband wireless access system 2200 may further comprise a visited connectivity service network (CSN) 2224 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 2224 or home CSN 2226, and the scope of the claimed subject matter is not limited in these respects. Visited CSN 2224 may be referred to as a visited CSN in the case where visited CSN 2224 is not part of the regular service provider of fixed device 2216 or mobile device 2222, for example where fixed 2216 or mobile device 2222 is roaming away from their respective home CSN 2226, or where broadband wireless access system 2200 is part of the regular service provider of fixed device 2216 or mobile device 2222 but where broadband wireless access system 2200 may be in another location or state that is not the main or home location of fixed device 2216 or mobile device 2222.

Fixed device 2216 may be located anywhere within range of one or both base stations 2214, 2220, such as in or near a home or business to provide home or business customer broadband access to Internet 2210 via base stations 2214, 2220 and ASN 2212, 2218, respectively, and home CSN 2226. It is worthy to note that although fixed device 2216 is generally disposed in a stationary location, it may be moved to different locations as needed. Mobile device 2222 may be utilized at one or more locations if mobile device 2222 is within range of one or both base stations 2214, 2220, for example.

In accordance with one or more embodiments, operation support system (OSS) 2228 may be part of broadband wireless access system 2200 to provide management functions for broadband wireless access system 2200 and to provide interfaces between functional entities of broadband wireless access system 2200. Broadband wireless access system 2200 of FIG. 22 is merely one type of wireless network showing a certain number of the components of broadband wireless access system 2200, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus for a processor circuit for an MTC-IWF capable of operating in compliance with one or more 3GPP LTE standards including LTE-A and may include a receive component. For this examples, the receive component may be for execution by the processor circuit to receive a DAR command from an SCS through a Tsp interface. The DAR command may include a Device-Action AVP having an UE identifier to indicate an UE to receive a trigger message initiated by the SCS, an SCS-Identifier for the SCS, a Reference-Number AVP set to identify the trigger message and an Action-Type AVP set to a value to indicate a device trigger recall request to recall the trigger message. The apparatus may also include a status component for execution by the processor circuit to determine a status of the device trigger recall request responsive to one of an initiation of a recall procedure with an SMS-SC or a rejection of the initiation of the recall procedure by the MTC-IWF. The apparatus may also include an answer component for execution by the processor circuit to send a DAA command to the SCS through the Tsp interface. The DAA command may include a Device-Notification AVP having the UE identifier, the SCS-Identifier, the Reference-Number AVP, the Action-Type AVP and a Request-Status AVP set to a value to indicate success or failure of the device trigger recall request.

Example 2

The apparatus of example 1, the UE identifier may include one of an External-Id or an MSISDN.

Example 3

The apparatus of example 1, the Device-Action AVP may have an assigned AVP code of 3001, the Reference-Number AVP may have an assigned AVP code of 3007, the Action-Type AVP may have an assigned AVP code of 3005, the Device-Notification AVP may have an assigned AVP code of 3002 and the Request-Status AVP may have an assigned AVP code of 3008.

Example 4

The apparatus of example 1, the value may indicate the device recall request comprises the value set to 3.

Example 5

The apparatus of example 1, the value to indicate success or failure of the device trigger recall request may include the value set to 0 for indicating success or the value set to 111 to indicate trigger recall failure or value set to 112 to indicated original trigger message already sent.

Example 6

The apparatus of example 1 may also include a digital display coupled to the processor circuit to present a user interface view.

Example 7

An example method may include receiving, at an MTC-IWF capable of operating in compliance with one or more 3GPP LTE standards including LTE-A, a DAR command from an SCS through a Tsp interface. The DAR command may include a Device-Action AVP having an UE identifier to indicate an UE to receive a trigger message initiated by the SCS, an SCS-Identifier for the SCS, a Reference-Number AVP set to identify the trigger message and an Action-Type AVP set to a value to indicate a device trigger recall request to recall the trigger message. The method may also include determining a status of the device trigger recall request responsive to one of an initiation of a recall procedure with an SMS-SC or a rejection of the initiation of the recall procedure by the MTC-IWF. The method may also include sending a DAA command to the SCS through the Tsp interface. The DAA command may include a Device-Notification AVP having the UE identifier, the SCS-Identifier, the Reference-Number AVP, the Action-Type AVP and a Request-Status AVP set to a value to indicate success or failure of the device trigger recall request.

Example 8

The method of example 7, the UE identifier may include one of an External-Id or an MSISDN.

Example 9

The method of example 7, the Device-Action AVP may have an assigned AVP code of 3001, the Reference-Number AVP may have an assigned AVP code of 3007, the Action-Type AVP may have an assigned AVP code of 3005, the Device-Notification AVP may have an assigned AVP code of 3002 and the Request-Status AVP may have an assigned AVP code of 3008.

Example 10

The method of example 7, the value to indicate the device recall request may include the value set to 3.

Example 11

The method of example 7, the value to indicate success or failure of the device trigger recall request may include the value set to 0 for indicating success or the value set to 111 to indicate trigger recall failure or value set to 112 to indicated original trigger message already sent.

Example 12

At least one machine readable medium may include a plurality of instructions that in response to being executed on a system at an UE, may cause the system to carry out a method according to any one of examples 7 to 11.

Example 13

An apparatus may include means for performing the methods of any one of examples 7 to 11.

Example 14

An example at least one machine readable medium may include a plurality of instructions that in response to being executed on a system for an SCS capable of operating in compliance with one or more or more 3GPP LTE standards including LTE-A, may causes the system to send a DAR command to a an MTC-IWF through a Tsp interface. The DAR command may include a Device-Action AVP having an UE identifier to indicate an UE to receive a trigger message initiated by the SCS, an SCS-Identifier for the SCS, a Reference-Number AVP set to identify the trigger message and an Action-Type AVP set to a value to indicate a device trigger recall request to recall the trigger message. The instructions may also cause the system to receive a DAA command from the MTC-IWF through the Tsp interface. The DAA command may include a Device-Notification AVP having the UE identifier, the SCS-Identifier, the Reference-Number AVP, the Action-Type AVP and a Request-Status AVP set to a value to indicate success or failure of the device trigger recall request. The instructions may also cause the system to determine the status of the device trigger replace request based on the value set in the request-status AVP.

Example 15

The at least one machine readable medium of example 14, the UE identifier may include one of an External-Id or an MSISDN.

Example 16

The at least one machine readable medium of example 14, the Device-Action AVP may have an assigned AVP code of 3001, the Reference-Number AVP may have an assigned AVP code of 3007, the Action-Type AVP may have an assigned AVP code of 3005, the Device-Notification AVP may have an assigned AVP code of 3002 and the Request-Status AVP may have an assigned AVP code of 3008.

Example 17

The at least one machine readable medium of example 14, the value may indicate the device recall request comprises the value set to 3.

Example 18

The at least one machine readable medium of example 14, the value to indicate success or failure of the device trigger recall request may include the value set to 0 for indicating success or the value set to 111 to indicate trigger recall failure or value set to 112 to indicated original trigger message already sent.

Example 19

An example apparatus may include a processor circuit for an SCS capable of operating in compliance with one or more 3GPP LTE standards including LTE-A. The apparatus may also include an action component for execution by the processor circuit to send a DAR command to an MTC-IWF through a Tsp interface. The DAR command may include a Device-Action AVP having an UE identifier to indicate an UE to receive a first trigger message initiated by the SCS, an SCS-Identifier for the SCS, an Action-Type AVP set to a value to indicate a device trigger replace request to replace the first trigger message with a second trigger message, a Reference-Number AVP set to identify the second trigger message and an Old-Reference-Number AVP set to identify the first trigger message. The apparatus may also include a receive component for execution by the processor circuit to receive a DAA command from the MTC-IWF through the Tsp interface. The DAA command may include a Device-Notification AVP having the UE identifier, the SCS-Identifier, the Reference-Number AVP, the Action-Type AVP and a Request-Status AVP set to a value to indicate success or failure of the device trigger replace request. The apparatus may also include a status component for execution by the processor circuit to determine the status of the device trigger replace request based on the value set in the Request-Status AVP.

Example 20

The apparatus of example 19, the UE identifier may include one of an External-Id or an MSISDN.

Example 21

The apparatus of example 19, the Device-Action AVP may have an assigned AVP code of 3001, the Reference-Number AVP may have an assigned AVP code of 3007, the Old-Reference-Number AVP may have an assigned AVP code of 3011, the Action-Type AVP may have an assigned AVP code of 3005, the Device-Notification AVP may have an assigned AVP code of 3002 and the Request-Status AVP may have an assigned AVP code of 3008.

Example 22

The apparatus of example 19, the Device-Notification AVP may also have a Validity-Time to indicate a time for which the device trigger replace request is valid.

Example 23

The apparatus of example 19, the Device-Notification AVP may also have a Trigger-Data AVP that includes a Payload having data to be sent to the UE with the second trigger message, a Priority-Indication for the second trigger message and an Application-Port-Identifier to identify a triggering application at the UE to receive the second trigger message.

Example 24

The apparatus of example 23, the Trigger-Data AVP may have an assigned AVP code of 3003, the Payload may have an assigned AVP code of 3004, the Priority-Indication may have an assigned AVP code of 3006 and the Application-Port-Identifier may have an assigned AVP code of 3010.

Example 25

The apparatus of example 19, the value may indicate the device replace request comprises the value set to 4.

Example 26

The apparatus of example 19, the value to indicate success or failure of the device trigger replace request may include the value set to 0 for indicating success or the value set to 110 to indicate trigger replace failure or value set to 112 to indicated original trigger message already sent.

Example 27

The apparatus of example 26, the value to indicate success or failure of the device trigger replace request may be set to 0. The MTC-IWF may be arranged to release a given identifier used by the SCS to identify the first trigger message based on the value set to 0. The release given identifier may be available to the SCS for a third trigger message to the UE or another UE.

Example 28

The apparatus of example 19 may also include a digital display coupled to the processor circuit to present a user interface view.

Example 29

An example method may include receiving, at an MTC-IWF capable of operating in compliance with one or more 3GPP LTE standards including LTE-A, a DAR command from an SCS through a Tsp interface. The DAR command may include a Device-Action AVP having an UE identifier to indicate an UE to receive a first trigger message initiated by the SCS, an SCS-Identifier for the SCS, an Action-Type AVP set to a value to indicate a device trigger replace request to replace the first trigger message with a second trigger message, a Reference-Number AVP set to identify the second trigger message and an Old-Reference-Number AVP set to identify the first trigger message. The method may also include forwarding the device trigger replace request to an SMS-SC. The method may also include determining a status of the device trigger replace request responsive to an indication from the SMS-SC of a success or failure to replace the first trigger message with the second trigger message. The method may also include sending a DAA command to the SCS through the Tsp interface. The DAA command may include a Device-Notification AVP having the UE identifier, the SCS-Identifier, the Reference-Number AVP, the Action-Type AVP and a Request-Status AVP set to a value to indicate success or failure of the device trigger replace request.

Example 30

The method of example 29, the UE identifier may include one of an External-Id or an MSISDN.

Example 31

The method of example 29, the Device-Action AVP may have an assigned AVP code of 3001, the Reference-Number AVP may have an assigned AVP code of 3007, the Old-Reference-Number AVP may have an assigned AVP code of 3011, the Action-Type AVP may have an assigned AVP code of 3005, the Device-Notification AVP may have an assigned AVP code of 3002 and the Request-Status AVP may have an assigned AVP code of 3008.

Example 32

The method of example 29, the Device-Notification AVP may also have a Validity-Time to indicate a time for which the device trigger replace request is valid.

Example 33

The method of example 29, the Device-Notification AVP may also have a Trigger-Data AVP that includes a Payload having data to be sent to the UE with the second trigger message, a Priority-Indication for the second trigger message and an Application-Port-Identifier to identify a triggering application at the UE to receive the second trigger message.

Example 34

The method of example 33, the Trigger-Data AVP may have an assigned AVP code of 3003, the Payload may have an assigned AVP code of 3004 and the Application-Port-Identifier may have an assigned AVP code of 3010.

Example 35

The method of example 29, the value to indicate the device replace request may include the value set to 4.

Example 36

The method of example 29, the value to indicate success or failure of the device trigger replace request may include the value set to 0 for indicating success or the value set to 110 to indicate trigger replace failure or value set to 112 to indicated original trigger message already sent.

Example 37

The method of example 36 may include the value to indicate success or failure of the device trigger replace request being set to 0. The method of example 36 may also include releasing a given identifier used to identify the first trigger message based on the value set to 0.

Example 38

An example At least one machine readable medium may include a plurality of instructions that in response to being executed on a system at an UE, may cause the system to carry out a method according to any one of examples 29 to 37.

Example 39

An example apparatus may include means for performing the methods of any one of examples 29 to 37.

Example 40

An example at least one machine readable medium may include a plurality of instructions that in response to being executed on a system for an MTC-IWF capable of operating in compliance with one or more or more 3$^{rd}$ Generation Partnership Project (3GPP) Long Term Evolution (LTE) standards including LTE-Advanced (LTE-A) may cause the system to receive a DAR command from an SCS. The DAR command may be receive through a Tsp interface. The DAR command may include a Device-Action AVP having an UE identifier to indicate an UE to receive a first trigger message initiated by the SCS, an SCS-Identifier for the SCS, an Action-Type AVP set to a value to indicate a device trigger replace request to replace the first trigger message with a second trigger message, a Reference-Number AVP set to identify the second trigger message and an Old-Reference-Number AVP set to identify the first trigger message. The instructions may also cause the system to forward the device trigger replace request to an SMS-SC. The instructions may also cause the system to determine a status of the device trigger replace request responsive to an indication from the SMS-SC of a success or failure to replace the first trigger message with the second trigger message. The instructions may also cause the system to send a DAA command to the SCS through the Tsp interface. The DAA command may include a Device-Notification AVP having the UE identifier, the SCS-Identifier, the Reference-Number AVP, the Action-Type AVP and a Request-Status AVP set to a value to indicate success or failure of the device trigger replace request.

Example 41

The least one machine readable medium of example 40, the UE identifier may include one of an External-Id or an MSISDN.

Example 42

The least one machine readable medium of example 40, the Device-Action AVP may have an assigned AVP code of 3001, the Reference-Number AVP may have an assigned AVP code of 3007, the Old-Reference-Number AVP may have an assigned AVP code of 3011, the Action-Type AVP may have an assigned AVP code of 3005, the Device-Notification AVP may have an assigned AVP code of 3002 and the Request-Status AVP may have an assigned AVP code of 3008.

Example 43

The least one machine readable medium of example 40, the Device-Notification AVP may also have a Validity-Time to indicate a time for which the device trigger replace request is valid.

Example 44

The least one machine readable medium of example 40, the Device-Notification AVP may also have a Trigger-Data AVP that includes a Payload having data to be sent to the UE with the second trigger message, a Priority-Indication for the second trigger message and an Application-Port-Identifier to identify a triggering application at the UE to receive the second trigger message.

Example 45

The least one machine readable medium of example 44, the Trigger-Data AVP may have an assigned AVP code of 3003, the Payload may have an assigned AVP code of 3004 and the Application-Port-Identifier may have an assigned AVP code of 3010.

Example 46

The least one machine readable medium of example 40, the value to indicate the device replace request may include the value set to 4.

Example 47

The least one machine readable medium of example 40, the value to indicate success or failure of the device trigger replace request may include the value set to 0 for indicating success or the value set to 110 to indicate trigger replace failure or value set to 112 to indicated original trigger message already sent.

Example 48

The least one machine readable medium of example 47, the value to indicate success or failure of the device trigger replace request may be set to 0. The instructions may further cause the system to release a given identifier used to identify the first trigger message based on the value set to 0.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the examples. In addition, in the foregoing Detailed Description, it can be seen that various features are grouped together in a single example for the purpose of streamlining the disclosure.

This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An apparatus comprising:
  logic for a machine type communication-interworking function (MTC-IWF), at least a portion of the logic in hardware, the logic to:
    receive a Device-Action-Request (DAR) command from a service capability server (SCS) through a telecommunications service provider (Tsp) interface, the DAR command including a Device-Action attribute value pair (AVP) having an user equipment (UE) identifier to indicate an UE to receive a trigger message initiated by the SCS, an SCS-Identity for the SCS, a Reference-Number to identify the trigger message and an Action-Type AVP set to a value to indicate a device trigger recall request to recall the trigger message;

determine a status of the device trigger recall request responsive to one of an initiation of a recall procedure with a short message service-service center (SMS-SC) or a rejection of the initiation of the recall procedure by the MTC-IWF or by the SMS-SCS; and send a Device-Action-Answer (DAA) command to the SCS, the DAA command including a Device-Notification AVP having the UE identifier, the SCS-Identity, the Reference-Number, the Action-Type AVP and a Request-Status AVP set to a value to indicate success or failure of the device trigger recall request.

2. The apparatus of claim 1, the UE identifier including at least one of an External-Id or a mobile subscriber integrated services digital network-number (MSISDN).

3. The apparatus of claim 1, the Device-Action AVP having an assigned AVP code of 3001, the Reference-Number having an assigned AVP code of 3007, the Action-Type AVP having an assigned AVP code of 3005, the Device-Notification AVP having an assigned AVP code of 3002 and the Request-Status AVP having an assigned AVP code of 3008.

4. The apparatus of claim 1, the value to indicate the device trigger recall request comprises the value set to 3.

5. The apparatus of claim 1, the value to indicate success or failure of the device trigger recall request comprises the value set to 0 for indicating success or the value set to 111 to indicate trigger recall failure or value set to 112 to indicate original trigger message already sent.

6. The apparatus of claim 1, comprising the MTC-IWF capable of operating in compliance with one or more $3^{rd}$ Generation Partnership Project (3GPP) Long Term Evolution (LTE) standards including LTE-Advanced (LTE-A).

7. A method comprising:

receiving, at a machine type communication-interworking function (MTC-IWF), a Device-Action-Request (DAR) command from a service capability server (SCS) through a telecommunications service provider (Tsp) interface, the DAR command including a Device-Action attribute value pair (AVP) having an user equipment (UE) identifier to indicate an UE to receive a trigger message initiated by the SCS, an SCS-Identity for the SCS, a Reference-Number to identify the trigger message and an Action-Type AVP set to a value to indicate a device trigger recall request to recall the trigger message;

determining a status of the device trigger recall request responsive to one of an initiation of a recall procedure with a short message service-service center (SMS-SC) or a rejection of the initiation of the recall procedure by the MTC-IWF or by the SMS-SC; and sending a Device-Action-Answer (DAA) command to the SCS, the DAA command including a Device-Notification AVP having the UE identifier, the SCS-Identity, the Reference-Number, the Action-Type AVP and a Request-Status AVP set to a value to indicate success or failure of the device trigger recall request.

8. The method of claim 7, the UE identifier including at least one of an External-Id or a mobile subscriber integrated services digital network-number (MSISDN).

9. The method of claim 7, the Device-Action AVP having an assigned AVP code of 3001, the Reference-Number having an assigned AVP code of 3007, the Action-Type AVP having an assigned AVP code of 3005, the Device-Notification AVP having an assigned AVP code of 3002 and the Request-Status AVP having an assigned AVP code of 3008.

10. The method of claim 7, the value to indicate the device trigger recall request comprises the value set to 3.

11. The method of claim 7, the value to indicate success or failure of the device trigger recall request comprises the value set to 0 for indicating success or the value set to 111 to indicate trigger recall failure or value set to 112 to indicated original trigger message already sent.

12. The method of claim 7, comprising the MTC-IWF capable of operating in compliance with one or more $3^{rd}$ Generation Partnership Project (3GPP) Long Term Evolution (LTE) standards including LTE-Advanced (LTE-A).

13. At least one non-transitory machine readable medium comprising a plurality of instructions that in response to being executed on a system causes the system to:

send a Device-Action-Request (DAR) command to a machine type communication-interworking function (MTC-IWF) through a telecommunications service provider (Tsp) interface, the DAR command including a Device-Action attribute value pair (AVP) having an user equipment (UE) identifier to indicate an UE to receive a trigger message initiated by a service capability server (SCS), an SCS-Identity for the SCS, a Reference-Number to identify the trigger message and an Action-Type AVP set to a value to indicate a device trigger recall request to recall the trigger message;

receive a Device-Action-Answer (DAA) command from the MTC-IWF, the DAA command including a Device-Notification AVP having the UE identifier, the SCS-Identity, the Reference-Number, the Action-Type AVP and a Request-Status AVP set to a value to indicate success or failure of the device trigger recall request; and determine a status of the device trigger recall request based on the value set in the Request-Status AVP.

14. The at least one non-transitory machine readable medium of claim 13, the Device-Action AVP having an assigned AVP code of 3001, the Reference-Number having an assigned AVP code of 3007, the Action-Type AVP having an assigned AVP code of 3005, the Device-Notification AVP having an assigned AVP code of 3002 and the Request-Status AVP having an assigned AVP code of 3008.

15. The at least one non-transitory machine readable medium of claim 13, comprising the SCS capable of operating in compliance with one or more $3^{rd}$ Generation Partnership Project (3GPP) Long Term Evolution (LTE) standards including LTE-Advanced (LTE-A).

16. An apparatus comprising:

logic for a service capability server (SCS), at least a portion of the logic in hardware, the logic to:

send a Device-Action-Request (DAR) command to a machine type communication-interworking function (MTC-IWF) through a telecommunications service provider (Tsp) interface, the DAR command including a Device-Action attribute value pair (AVP) having an user equipment (UE) identifier to indicate an UE to receive a first trigger message initiated by the SCS, an SCS-Identity for the SCS, an Action-Type AVP set to a value to indicate a device trigger replace request to replace the first trigger message with a second trigger message, a Reference-Number to identify the second trigger message and an Old-Reference-Number to identify the first trigger message;

receive a Device-Action-Answer (DAA) command from the MTC-IWF, the DAA command including a Device-Notification AVP having the UE identifier, the SCS-Identity, the Reference-Number, the Action-Type AVP and a Request-Status AVP set to a value to indicate success or failure of the device trigger replace request; and determine a status of the device trigger replace request based on the value set in the Request-Status AVP.

17. The apparatus of claim 16, the UE identifier including at least one of an External-Id or a mobile subscriber integrated services digital network-number (MSISDN).

18. The apparatus of claim 16, the Device-Action AVP also having a Validity-Time to indicate a time for which the device trigger replace request is valid.

19. The apparatus of claim 16, the Device-Action AVP also having a Trigger-Data AVP that includes a Payload having data to be sent to the UE with the second trigger message, a Priority-Indication for the second trigger message and an Application-Port-Identifier to identify a triggering application at the UE to receive the second trigger message.

20. The apparatus of claim 19, the Trigger-Data AVP having an assigned AVP code of 3003, the Payload having an assigned AVP code of 3004, the Priority-Indication having an assigned AVP code of 3006 and the Application-Port-Identifier having an assigned AVP code of 3010.

21. The apparatus of claim 16, the value to indicate the device trigger replace request comprises the value set to 4.

22. The apparatus of claim 16, the value to indicate success or failure of the device trigger replace request comprises the value set to 0 for indicating success or the value set to 110 to indicate trigger replace failure or value set to 112 to indicate original trigger message already sent.

23. The apparatus of claim 22, the value to indicate success or failure of the device trigger replace request is set to 0, the MTC-IWF arranged to release a given identifier used by the SCS to identify the first trigger message based on the value set to 0, the released given identifier available to the SCS for a third trigger message to the UE or another UE.

24. The apparatus of claim 16, comprising the SCS capable of operating in compliance with one or more $3^{rd}$ Generation Partnership Project (3GPP) Long Term Evolution (LTE) standards including LTE-Advanced (LTE-A).

25. At least one non-transitory machine readable medium comprising a plurality of instructions that in response to being executed on a system causes the system to:

receive a Device-Action-Request (DAR) command from a service capability server (SCS) through a telecommunications service provider (Tsp) interface, the DAR command including a Device-Action attribute value pair (AVP) having an user equipment (UE) identifier to indicate an UE to receive a first trigger message initiated by the SCS, an SCS-Identity for the SCS, an Action-Type AVP set to a value to indicate a device trigger replace request to replace the first trigger message with a second trigger message, a Reference-Number to identify the second trigger message and an Old-Reference-Number to identify the first trigger message;

forward the device trigger replace request to a short message service-service center (SMS-SC);

determine a status of the device trigger replace request responsive to an indication from the SMS-SC of a success or failure to replace the first trigger message with the second trigger message; and send a Device-Action-Answer (DAA) command to the SCS, the DAA command including a Device-Notification AVP having the UE identifier, the SCS-Identity, the Reference-Number, the Action-Type AVP and a Request-Status AVP set to a value to indicate success or failure of the device trigger replace request.

26. The at least one non-transitory machine readable medium of claim 25, the Device-Action AVP having an assigned AVP code of 3001, the Reference-Number having an assigned AVP code of 3007, the Old-Reference-Number having an assigned AVP code of 3011, the Action-Type AVP having an assigned AVP code of 3005, the Device-Notification AVP having an assigned AVP code of 3002 and the Request-Status AVP having an assigned AVP code of 3008.

27. The at least one non-transitory machine readable medium of claim 25, the value to indicate success or failure of the device trigger replace request comprises the value set to 0 for indicating success or the value set to 110 to indicate trigger replace failure or value set to 112 to indicate original trigger message already sent, the value to indicate success or failure of the device trigger replace request is set to 0, the instructions to further cause the system to release a given identifier used to identify the first trigger message based on the value set to 0.

28. The at least one non-transitory machine readable medium of claim 25, comprising the SCS capable of operating in compliance with one or more $3^{rd}$ Generation Partnership Project (3GPP) Long Term Evolution (LTE) standards including LTE-Advanced (LTE-A).

* * * * *